(12) United States Patent
Hoshizuki

(10) Patent No.: US 11,651,429 B2
(45) Date of Patent: May 16, 2023

(54) TRADING SYSTEM AND RECORDING MEDIUM

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 190 days.

(21) Appl. No.: 17/131,288

(22) Filed: Dec. 22, 2020

(65) Prior Publication Data

US 2021/0201409 A1 Jul. 1, 2021

(30) Foreign Application Priority Data

Dec. 25, 2019 (JP) .............................. JP2019-235025
Dec. 8, 2020 (JP) .............................. JP2020-203408

(51) Int. Cl.
*G06Q 40/04* (2012.01)
*G06Q 40/06* (2012.01)
*H04L 9/06* (2006.01)
*H04L 9/08* (2006.01)
*H04L 9/00* (2022.01)

(52) U.S. Cl.
CPC ............ *G06Q 40/04* (2013.01); *G06Q 40/06* (2013.01); *H04L 9/0643* (2013.01); *H04L 9/0822* (2013.01); *H04L 9/50* (2022.05)

(58) Field of Classification Search
None
See application file for complete search history.

(56) References Cited

U.S. PATENT DOCUMENTS

| 10,361,870 | B2 * | 7/2019 | Chow ................. G06Q 20/382 |
| 2002/0062445 | A1 | 5/2002 | Owada et al. |
| 2018/0241551 | A1 | 8/2018 | Fujimura et al. |
| 2019/0386814 | A1 * | 12/2019 | Ahmed .................. H04L 9/008 |

FOREIGN PATENT DOCUMENTS

| JP | 2002-158985 A | 5/2002 | |
| JP | 2017-050763 A | 3/2017 | |
| JP | 2019-106639 A | 6/2019 | |
| JP | 2019106639 A * | 6/2019 | .......... H01Q 1/1271 |
| WO | WO-2020010023 A1 * | 1/2020 | ............. G06F 16/27 |

OTHER PUBLICATIONS

Office Action issued in JP 2020-203408 dated Dec. 7, 2021 (3 pages).

* cited by examiner

*Primary Examiner* — Christopher Bridges
(74) *Attorney, Agent, or Firm* — Masuvalley & Partners; Peter R. Martinez

(57) ABSTRACT

A trading system includes a first trading apparatus including a first processor, and a second trading apparatus including a second processor. The first processor encrypts data using secret information. The first processor publishes second trading information on a distributed ledger when first trading information enabling reception of crypto assets on a condition of publication of argument information that enables derivation of the secret information is published on a distributed ledger. The second trading information is information for receiving the crypto assets and includes the argument information. The second processor publishes the first trading information on a distributed ledger. The second processor acquires the argument information when the second trading information is published on a distributed ledger. The second processor decrypts encrypted data using the argument information.

6 Claims, 9 Drawing Sheets

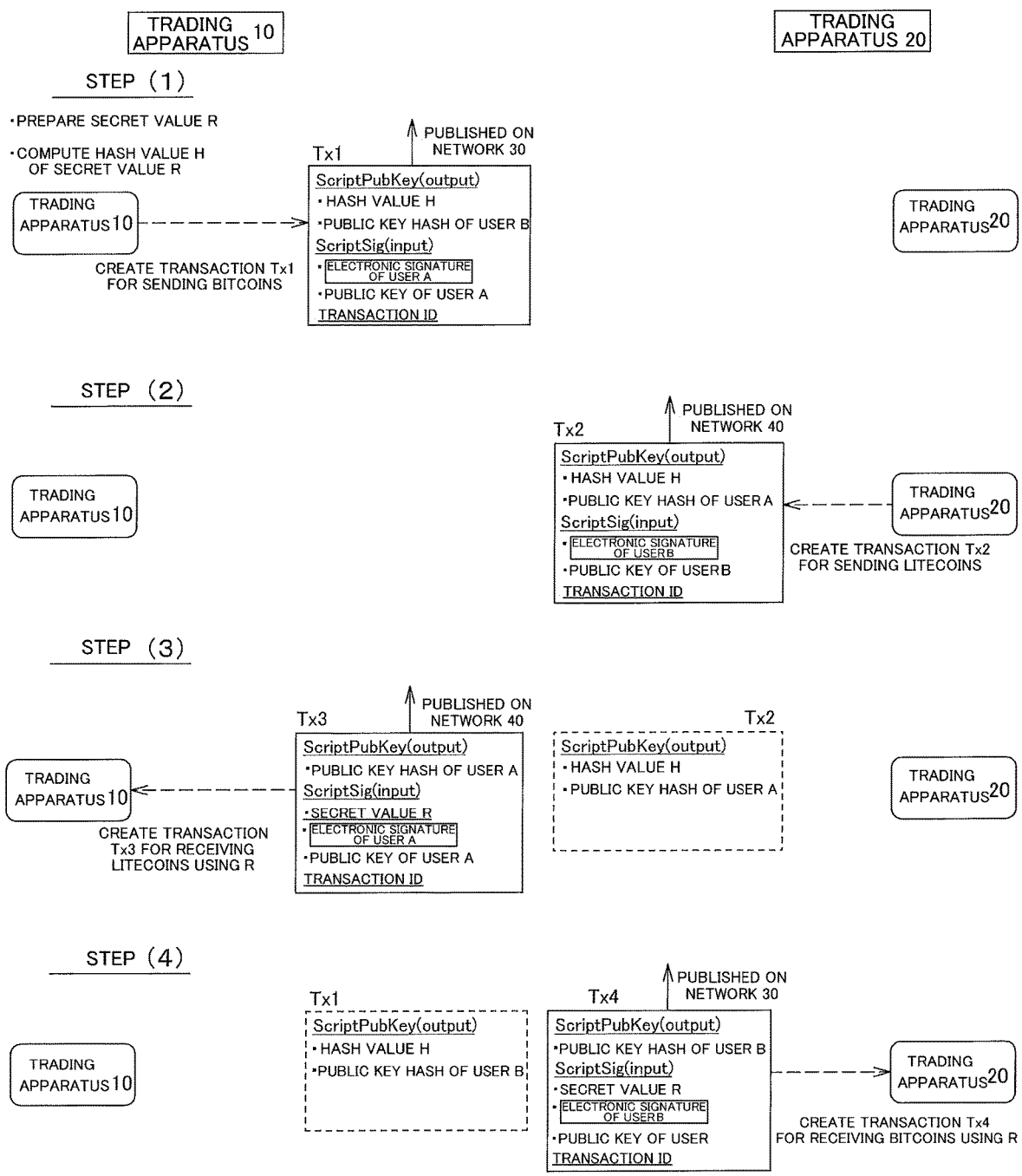

FIG.4

STEP (11)
TRADING APPARATUS 70
- SELECT RANDOM PRIVATE CONTENTS KEY k FROM INTEGERS
- CALCULATE PUBLIC CONTENTS KEY u=SHA256(SHA256(k))

TRADING APPARATUS 80

STEP (12)
TRADING APPARATUS 70 --- PUBLIC CONTENTS KEY u, ENCRYPTED CONTENTS ---> TRADING APPARATUS 80
(CLOUD STORAGE, E-MAIL, etc.)
- ENCRYPT CONTENTS
  (KEEP LOW FREQUENCY COMPONENTS IN PLAIN TEXT, ENCRYPT HIGH FREQUENCY COMPONENTS USING PRIVATE CONTENTS KEY k)
- TRANSMIT ENCRYPTED CONTENTS WITH PUBLIC CONTENTS KEY u

STEP (13)
TRADING APPARATUS 70

- DECOMPRESS UNENCRYPTED PORTION TRADING APPARATUS 80
  (LOW FREQUENCY COMPONENTS)

STEP (14)
TRADING APPARATUS 70

Tx11 ↑ PUBLISHED ON NETWORK 30

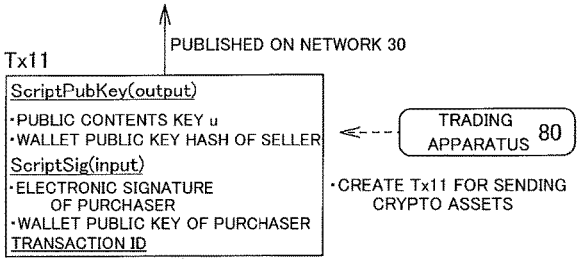

- CREATE Tx11 FOR SENDING CRYPTO ASSETS

STEP (15)
TRADING APPARATUS 70 <---

Tx12 ↑ PUBLISHED ON NETWORK 30        Tx11

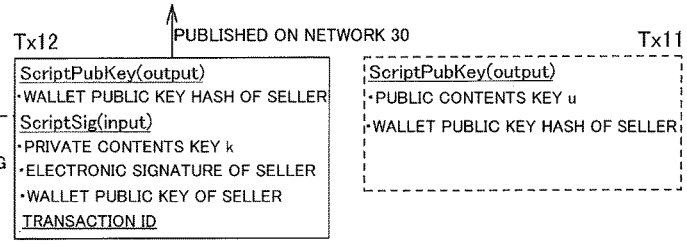

TRADING APPARATUS 80

CREATE Tx12 FOR RECEIVING CRYPTO ASSETS USING PRIVATE CONTENTS KEY k

STEP (16)
TRADING APPARATUS 70     TRADING APPARATUS 80

- ACQUIRE PRIVATE CONTENTS KEY k PUBLISHED ON NETWORK 30
- DECRYPT/DECOMPRESS HIGH FREQUENCY COMPONENTS USING PRIVATE CONTENTS KEY k

FIG.6

STEP (21)

[TRADING APPARATUS 70]
- SELECT RANDOM PRIVATE CONTENTS KEY k FROM INTEGERS
- CALCULATE PUBLIC CONTENTS KEY u=kG

[TRADING APPARATUS 80]

STEP (22)

[TRADING APPARATUS 70] — PUBLIC CONTENTS KEY u, ENCRYPTED CONTENTS → [TRADING APPARATUS 80]
(CLOUD STORAGE, E-MAIL, etc.)

- ENCRYPT CONTENTS
  (KEEP LOW FREQUENCY COMPONENTS IN PLAIN TEXT, ENCRYPT HIGH FREQUENCY COMPONENTS USING PRIVATE CONTENTS KEY k)
- TRANSMIT ENCRYPTED CONTENTS WITH PUBLIC CONTENTS KEY u

STEP (23)

[TRADING APPARATUS 70] ← TEMPORARY KEY t — [TRADING APPARATUS 80]

- DETERMINE TEMPORARY KEY t AND TRANSMIT TO SELLER

STEP (24)

[TRADING APPARATUS 70]    [SMART CONTRACT 500] ← TRANSACTION FOR SENDING PAYMENT TO SELLER ADDRESS — [TRADING APPARATUS 80]

- HOLD CRYPTO ASSETS
- RECORD POINT P USING PUBLIC CONTENTS KEY u

Tx21: COMMAND OF METHOD EXECUTION AT SENDING
ARGUMENTS:
- PUBLIC CONTENTS KEY u
- SELLER WALLET PUBLIC KEY HASH

STEP (25)

Tx22: COMMAND FOR METHOD EXECUTION AT DRAWING
ARGUMENTS:
- SELLER WALLET PUBLIC KEY HASH
- $(t+k) \mod n$

[TRADING APPARATUS 70] → TRANSACTION FOR EXECUTING CRYPTO ASSET DRAWING METHOD → [SMART CONTRACT 500]    [TRADING APPARATUS 80]
← TRANSACTION FOR DRAWING CRYPTO ASSETS BY DRAWING METHOD

- VERIFY MATCH OF RECIPIENT ADDRESSES
- VERIFY DESIGNATION OF ARGUMENT MEETING P=hG
- DRAW CRYPTO ASSETS

STEP (26)

[TRADING APPARATUS 70]    [SMART CONTRACT 500] — $(t+k) \mod n$ → [TRADING APPARATUS 80]

- READ $(t+k) \mod n$
- CALCULATE PRIVATE CONTENTS KEY $k=(a+n-t) \mod n$
- DECRYPT, DECOMPRESS HIGH FREQUENCY COMPONENTS USING PRIVATE CONTENTS KEY k

TRADING SYSTEM AND RECORDING MEDIUM

CROSS-REFERENCE TO RELATED APPLICATION

This application is based upon and claims the benefit of priorities of the prior Japanese Patent Application No. 2019-235025, filed on Dec. 25, 2019 and the prior Japanese Patent Application No. 2020-203408, filed on Dec. 8, 2020, the entire contents of which are incorporated herein by reference.

FIELD

The embodiments discussed herein are related to a trading system and a recording medium.

BACKGROUND

Digital contents data such as sound and video are often subject to a sales transaction via the Internet.

In such a sales transaction of digital contents data, provision of contents data to a purchaser by a seller after payment of the value by the purchaser, or payment of the value by the purchaser after provision of the data by the seller is typically performed.

That is, unlike face-to-face sales transactions, there is a time lag in the timing between provision of digital contents data as a product and payment of the value. This may variously cause improper sales transactions. One of the improper sales transactions is abscondence with a product or the value.

There is a case in which the seller does not provide the product (digital contents data) despite payment of the value by the purchaser, or the purchaser does not pay the value despite provision of the product by the seller.

In recent years, a service called crowdsourcing in which a contents data creator and a client that requests creation are matched to outsource the creation operation has become common.

Also in such a service, there is a case in which a trouble related to exchanging of created contents data (a deliverable) and the value occurs.

For example, there is a case in which the client does not pay the value after having received the deliverable or the creator only receives the value and does not transmit the deliverable, which becomes a great problem.

To solve these problems, it is disclosed that a usage permission is requested to use sold digital contents data.

A purchaser of digital contents data requests a permission along with payment of the value and can use the contents data only after the permission is granted (for example, Japanese Patent Application Laid-Open No. 2017-50763).

It is also described that digital contents data is encrypted. A purchaser of digital contents data can utilize digital contents data by acquiring a decryption key along with payment of the value (for example, Japanese Patent Application Laid-Open No. 2002-158985).

Because contents data cannot be utilized until a usage permission is granted or a decryption key is acquired with payment of the value, it can be said that there is no point in absconding only with digital contents data.

However, it can be said that improper trades are not always resolved even if digital contents data is encrypted or a permission is required at the utilization of digital contents data as described above. For example, some sellers do not provide a usage permission or a decryption key although a purchaser pays the value, or existence of a person that utilizes contents data using a decryption key acquired from a third party without paying the value cannot be denied.

SUMMARY

According to an embodiment, a trading system includes a first trading apparatus and a second trading apparatus. The first trading apparatus includes a first processor which executes a process described below. The first processor encrypts data using secret information. The first processor publishes second trading information on a distributed ledger when first trading information enabling reception of crypto assets on a condition of publication of argument information that enables derivation of the secret information is published on a distributed ledger. The second trading information is information for receiving the crypto assets and includes the argument information. The second trading apparatus includes a second processor which executes a process described below. The second processor publishes the first trading information on a distributed ledger. The second processor acquires the argument information when the second trading information is published on a distributed ledger. The second processor decrypts encrypted data using the argument information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of processing of an atomic swap.

FIG. 4 is a diagram illustrating an example of a method for exchanging contents data and crypto assets in a one-to-one relation.

FIG. 6 is a diagram illustrating an example of a method of exchanging contents data and crypto assets on a one-to-many basis.

DESCRIPTION OF EMBODIMENTS

Figure 1:
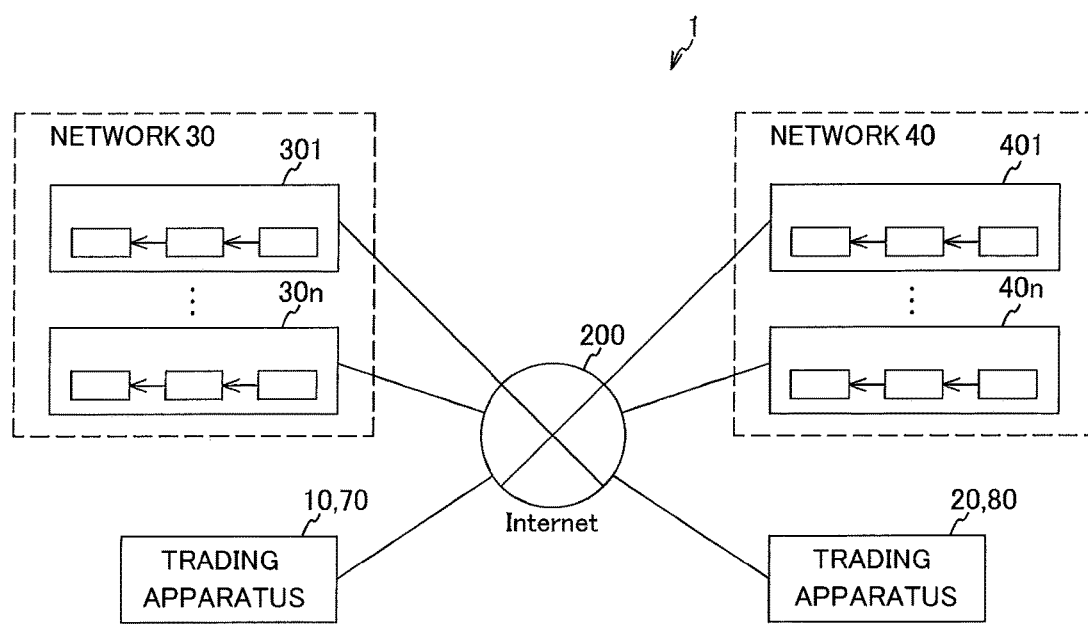
FIG. 1 is a diagram illustrating an example of a network structure according to the present embodiment.

The present embodiment relates to a system that trustlessly performs a sales transaction of contents data by using distributed ledgers. The purchaser of the contents data pays the value of contents data by sending crypto assets to the seller via distributed ledgers.

The distributed ledger is a technique of storing data with a configuration that enables detection of falsification using electronic signatures and hash pointers, in a plurality of nodes distributed on a network.

The distributed ledger is, for example, a blockchain or a DAG (Directed Acyclic Graph). In the following explanations, as an example, the distributed ledger is described as it is assumed to be a blockchain.

In the DAG, when a user creates a transaction, an unapproved transaction that is previously published is approved. The transaction created by the user is also approved by an unapproved transaction that will be published later. The DAG adopts a consensus algorithm in which a transaction created by a user is considered to obtain a consensus on a network when the transaction is directly or indirectly approved by unapproved transactions equal to or more than a threshold value.

As described above, the DAG can use a transaction configuration identical to that of a blockchain explained below while the consensus algorithm is different from that of the blockchain.

Therefore, processing using a blockchain as a distributed ledger and processing using a DAG as a distributed ledger can be performed using transactions with identical configurations. Therefore, the processing using a blockchain as a distributed ledger explained below can also be performed using a DAG as a distributed ledger.

[Blockchain]

A blockchain and sending of crypto assets are outlined while details thereof will be described later.

A blockchain is a database in which blocks each including plural pieces of trading information are generated and the generated blocks are coupled to record data in a distributed network.

Because a block includes a hash value indicating contents of a block generated immediately before, in addition to the pieces of trading information, the blockchain has a data structure in which the generated blocks are linked in chronological order. The blockchain is a basic technique for crypto assets (virtual currencies) typified by Bitcoin, Monacoin, Ethereum, and the like.

A trade of assets is represented in a data format referred to as "transaction" and is shared by a P2P (Peer-to-Peer) network. An operation of organizing all transactions in a Merkle tree and finding a value called Nonce that enables a hash value summing up a root node (Merkle root) of the Merkle tree, a hash value of the previous block, a freely-selected Nonce, and the like to be equal to or lower than a certain value is called mining.

When mining is successful, a mining reward is obtained. A mechanism in which falsification of older data is more difficult due to a large number of computational resources allotted to mining for a mining reward is called "PoW (Proof of Work) blockchain system".

In this way, a mechanism that promotes provision of resources for ensuring the reliability of a database by giving some reward is called "blockchain".

While a PoS (Proof of Stake) or PoI (Proof of Importance) blockchain may be applied as well as the PoW blockchain, explanations thereof are omitted.

[Mechanism of Sending Crypto Assets]

Currently dominant crypto assets are broadly divided into two groups. These are a group including Bitcoin, Litecoin, Monacoin, and the like that are derivatively developed from Bitcoin, and a group including Rootstock derivatively developed from Ethereum.

In the former group, the entity of a crypto asset is an unspent transaction output (UTXO).

A UTXO is generally locked so to be capable of being unlocked only with an electronic signature using elliptic curve cryptography called ECDSA (Elliptic Curve Digital Signature Algorithm). To enable only "the owner" having a special private key to unlock, a public key corresponding to the private key is generally described in a UTXO.

Sending of crypto assets is realized by unlocking with provision of an ECDSA electronic signature corresponding to the public key described in a UTXO, connecting to an input in a new transaction, and describing the public key of the owner as a sending destination in a UTXO of the new transaction.

Practically, a UTXO has a region called scriptPubKey, in which a program described in a programming language called Script is written. The input in a transaction that is to be connected to the UTXO has a region called scriptSig and the UTXO is unlocked when these two regions exactly correspond to each other.

An identical mechanism for Ethereum or crypto assets derived therefrom can be realized by using a smart contract.

FIG. 1 is a diagram illustrating an example of a network structure according to the present embodiment.

A network includes a trading apparatus 70, a trading apparatus 80, a network 30, a network 40, and a network 200. The trading apparatus 70, the trading apparatus 80, the network 30, and the network 40 are connected to be communicable with each other via the network 200.

The trading apparatus 70 and the trading apparatus 80 are, for example, computer devices described later. In the following explanations, it is assumed as an example that the trading apparatus 70 is a trading apparatus operated by a seller of contents data. It is also assumed that the trading apparatus 80 is a trading apparatus operated by a purchaser of contents data.

The network includes a trading apparatus 10 and a trading apparatus 20, which are referred to for explaining an atomic swap that the present embodiment is based on.

The network 30 and the network 40 are distributed networks such as a P2P network and record trading information on blockchains.

In the following explanations, the network 30 is assumed to employ proof-of-work (PoW) as a consensus algorithm of Bitcoin, as an example. The network 40 is, for example, assumed to employ proof-of-work as a consensus algorithm of Litecoin.

A blockchain on which trades occurring in the network 30 are recorded is referred to also as "Bitcoin blockchain". A blockchain on which trades occurring in the network 40 are recorded is referred to also as "Litecoin blockchain". Each of the network 30 and the network 40 may employ other consensus algorithms such as proof-of-stake (PoS), proof-of-importance (PoI), and proof-of-consensus (PoC).

In the network 30, a plurality of node devices 301 to 30$n$ that perform mining are connected to be capable of communicating. In the following explanations, the node devices 301 to 30$n$ are referred to also as "node devices 300" when not particularly distinguished from each other.

In the network 40, a plurality of node devices 401 to 40$n$ that perform mining are connected to be capable of communicating. In the following explanations, the node devices 401 to 40$n$ are referred to also as "node devices 400" when not particularly distinguished from each other.

In the proof-of-work, mining is an operation of searching for a nonce (hereinafter, also "correct nonce") that enables to obtain a hash value including a prescribed number of or more consecutive zeros (0) when a hash function is applied to data of a block while the nonce included in the block is changed. Data of a block includes the hash value of data of a previous block linked to the current block, the nonce, and trading information.

When generating a block, a node device verifies a transaction to be included in the block. The node device then approves a correct transaction, causes the approved transaction to be included in the block, and performs an operation of searching for a nonce. When finding a correct nonce, the node device generates a block including the correct nonce, and links the newly-generated block to the blockchain retained in the node device. The node device transmits the newly-generated block onto a network of the blockchain. The newly-generated block is linked also to blockchains retained in other node devices connected to the network. Accordingly, the transaction is recorded on the blockchains. In the following explanations, linking a block including a transaction to a blockchain is referred to also as "recording a transaction on a blockchain".

The network 200 may be further connected to other networks as well as the network 30 and the network 40. The network 200 may be further connected to other trading apparatuses in addition to the trading apparatus 70 and the trading apparatus 80.

Figure 2A:
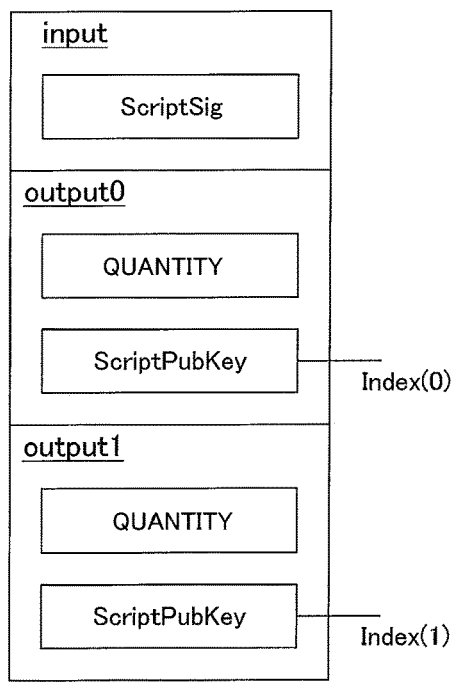
FIGS. 2A and 2B are diagrams illustrating an example of trading information of crypto assets.
Figure 2B:
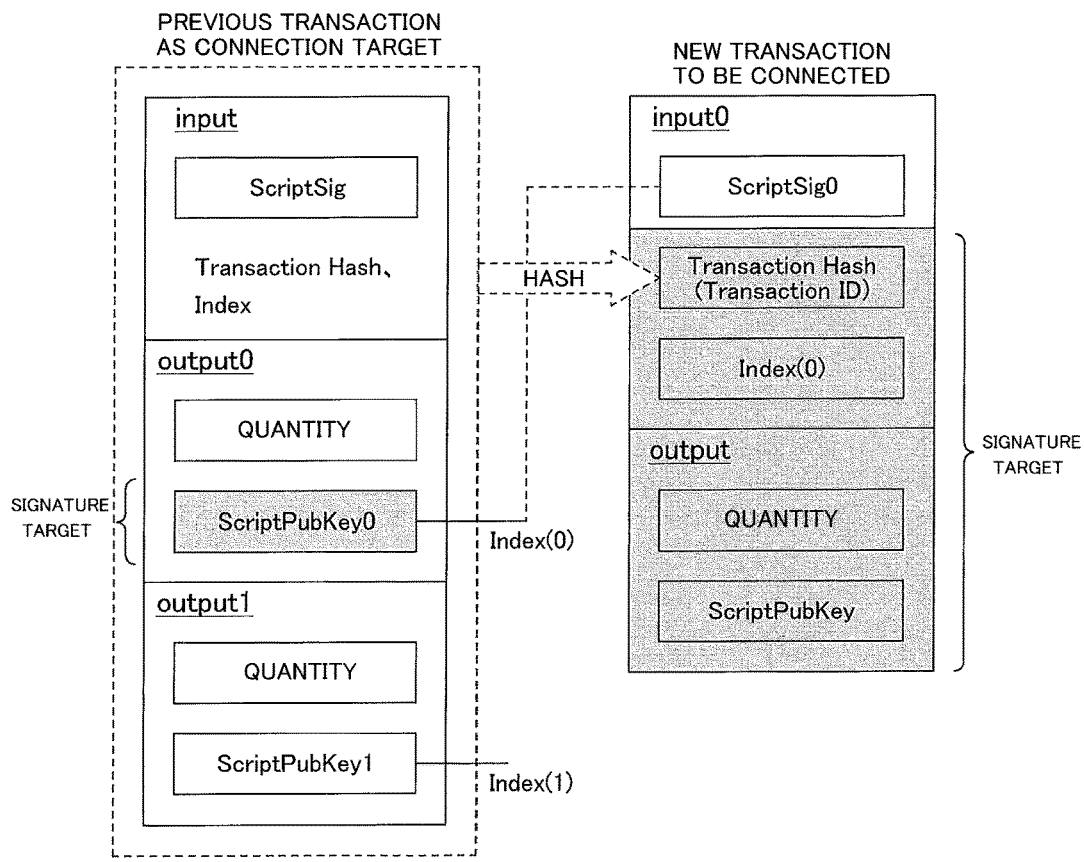

FIGS. 2A and 2B are diagrams illustrating an example of trading information of crypto assets.

FIG. 2A is a diagram for explaining a configuration of trading information. FIG. 2B is a diagram for explaining a process of connecting trading information. Trading information is a transaction to be used in a process of performing delivery and reception of crypto assets to transfer ownership of the crypto assets.

In the following explanations, it is assumed that P2PKH (Pay to Public Key Hash) is used as a transaction script. In the case of using P2PK (Pay to Public Key) as a transaction script, ScriptPubKey locking a UTXO includes a public key of a user as a transmission destination being a recipient of the UTXO. In the P2PK, ScriptSig unlocking a UTXO includes an electronic signature generated using a private key of a user as a transmission source creating a transaction, which is a provider of the UTXO.

A UTXO is an unspent transaction output that has not been spent as an input of a transaction. A UTXO is ownership of crypto assets and a UTXO is spent as an input of the next transaction. Therefore, sending of crypto assets is spending a UTXO by a payment sender and creating a UTXO that can be spent only by a payment receiver. An input of a transaction is information for processing a usage of crypto assets. An output of a transaction is information for processing an application of crypto assets. UTXO stands for Unspent Transaction Output.

An electronic signature is, for example, a value obtained by encrypting an electronic signature value obtained using data except ScriptSig of a transaction, and ScriptPubKey of a previous transaction, with a private key of a user being a transmission source that creates a transaction. The previous transaction is a transaction that is connected to an input of a transaction created at the time of payment sending by the user being the transmission source and that includes an output in which information of payment sending to the user being the transmission source is described. The electronic signature value is, for example, a value obtained by applying a hash function to the data including the data except ScriptSig of the transaction and ScriptPubKey of the previous transaction.

A configuration of a transaction is explained with reference to FIG. 2A.

A transaction is trading information summarizing transfers of crypto asset ownership. A transaction includes an input and an output.

The input is information for unlocking a UTXO of the previous transaction owned by a user being a transmission source that creates a transaction. The input includes ScriptSig.

ScriptSig is a script for unlocking a UTXO owned by the user being the transmission source. ScriptSig includes an electronic signature and a public key of the user as the transmission source. The electronic signature and the public key included in ScriptSig are values generated using a private key of the user as the transmission source.

The output is information indicating a transfer of crypto asset ownership. The output includes a quantity to be sent and ScriptPubKey.

ScriptPubKey is a script that defines a condition for unlocking the output of the transaction. ScriptPubKey includes a hash value (hereinafter, also "public key hash") of a public key generated using a private key of a user as a transmission destination.

A process of connecting transactions is explained with reference to FIG. 2B. In the following explanations, a process in which an output 0 of a previous transaction as a connection target is connected to a new transaction is explained as an example. It is assumed that each transaction is processed in the network 30.

The output of the previous transaction includes the output 0 including a quantity to be sent and ScriptPubKey0, and an output 1 including a quantity to be sent and ScriptPubKey1. The output 0 and the output 1 are associated with Index0 and Index1, respectively. Index0 and Index1 are identifiers for identifying the output 0 and the output 1, respectively.

An input 0 of the new transaction is connected to the output 0 of the previous transaction. Because no input of the new transaction or other transactions is connected to the output 1 of the previous transaction, the output 1 of the previous transaction is in the state of a UTXO.

The input 0 of the new transaction includes ScriptSig0, a transaction hash of the previous transaction, and Index0 being the identifier of the output 0 of the previous transaction.

ScriptSig0 includes an electronic signature and a public key to be used in a process of unlocking the output 0 of the previous transaction. The electronic signature is generated, for example, by encrypting an electronic signature value obtained using data except ScriptSig0 of the new transaction and ScriptPubKey0 included in the output 0 of the previous transaction, with a private key. At that time, a private key of the user creating the new transaction is used as the private key.

The transaction hash is a hash value of the entire previous transaction. The transaction hash is used as a transaction ID for identifying the previous transaction. Index0 is the identifier for identifying the output 0 as a connection destination in the previous transaction.

A process in which the output 0 included in the previous transaction and the input 0 included in the new transaction described above are connected is explained. In the following explanations, it is assumed that the previous transaction is in a state of being recorded on a Bitcoin blockchain.

A trading apparatus creates the new transaction and transmits the new transaction to the network 30, thereby storing the new transaction in a transaction pool that is included in each of the node devices 300 to store therein unverified transactions. When selecting the new transaction as a verification target, the relevant node device 300 refers to the transaction ID of the new transaction and Index0 and searches for a transaction on the blockchain. The node device 300 finds the previous transaction corresponding to the transaction ID and also finds the output 0 corresponding to Index®.

The node device 300 links ScriptSig0 included in the input 0 and ScriptPubKey0 included in the output 0 to each other. Accordingly, the node device 300 performs a first verification to verify matching between the hash value of the public key included in ScriptSig® and the public key hash included in ScriptPubKey0. The node device 300 further performs a second verification to verify an electronic signature using the electronic signature and the public key included in ScriptSig0. When the first verification and the second verification are approved, the node device 300 connects the output 0 of the previous transaction and the input 0 of the new transaction to each other.

The node device 300 causes the approved new transaction to be included in a block and performs an operation of searching for a nonce. When finding a correct nonce, the node device 300 generates a block including the correct nonce and links the newly-generated block to the blockchain retained in the node device 300. The node device 300 further transmits the newly-generated block onto the network of the blockchain. Accordingly, the newly-generated block is linked also to the blockchains retained in other node devices connected to the network and the new transaction is recorded on the blockchains.

FIG. 3 is a diagram illustrating an example of processing of an atomic swap.

This mechanism of the atomic swap is applied to a trading method according the present embodiment explained with reference to FIG. 4 and the subsequent drawings.

Therefore, the processing of the atomic swap is explained with reference to FIG. 3 before the trading method according to the present embodiment is explained.

As a premise, there are plural types of crypto assets having different characteristics. Accordingly, when using crypto assets, a user selects and use one type of the crypto assets suitable for an application. The types of crypto assets include, for example, Bitcoin (BTC: registered trademark), Ethereum (ETH: registered trademark), Litecoin (LTC), and Monacoin (MONA: registered trademark). Applications of crypto assets are, for example, value conservation, merchandise purchase, and fees for management of contract details.

To use plural types of crypto assets according to applications as described above, trades of exchanging different crypto assets are performed. Trades of exchanging different crypto assets include a direct trade which is a trade performed directly between users, and an intermediary trade which is a trade performed between users via a third party such as an exchange.

The direct trade of crypto assets is explained.

For example, when performing an exchange trade between Bitcoins owned by a user A and Litecoins owned by a user B, the user A sends the Bitcoins to the user B. Upon confirming that the Bitcoins have reached from the user A, the user B sends the Litecoins to the user A.

In the direct trade, the user B can abscond with the Bitcoins without sending the Litecoins to the user A after having confirmed that the Bitcoins have reached from the user A. Therefore, the user A needs to send the Bitcoins to the trading partner on the presumption that the trading partner is credible.

The intermediary trade of crypto assets is explained.

For example, a user A entrusts Bitcoins owned by himself/herself to an exchange. A user B entrusts Litecoins owned by himself/herself to the exchange. The exchange sends the Litecoins entrusted by the user B to the user A and sends the Bitcoins entrusted by the user A to the user B.

Because the user A and the user B entrust the crypto assets to the exchange in the intermediary trade, there is a risk that the crypto assets are stolen through a fraudulence of the exchange, hacking into the exchange, or the like. Further, because the exchange is used in the intermediary trade, fees are sometimes relatively higher than in the direct trade. Therefore, the user A needs to entrust Bitcoins on the presumption that the exchange is credible and that the fees are relatively high.

To solve these problems, the atomic swap is used, which enables a direct trade without abscondence with crypto assets even in a trade between individuals without credibility.

When exchanging of crypto assets using different blockchains is performed between two persons, simultaneous sending from a user A to a user B and sending from the user B to the user A cannot be ensured if the user A and the user B simply mutually send their crypto assets. This is caused by different time periods required for the approval according to blockchains, different timings when their crypto assets are sent, and the like.

Further, a sending transaction before the approval can be withdrawn. In other words, one of the two persons can abscond with crypto assets by validating only a trade approved first and withdrawing the remaining trade.

In Bitcoins and the blockchain system derived therefrom, the Atomic Swap uses a programming language called Script that describes unlock conditions of an UTXO. The Atomic Swap uses a fact that a command for obtaining SHA256 being a one-way hash function and a command for performing a value comparison are included in a Script command set.

Specifically, exchanging of crypto assets between a user A and a user B is performed in the following procedure.

In the following explanations, a process of exchanging Bitcoins owned by a trading partner and Litecoins owned by a user is explained as an example. While a process in which the trading apparatus 10 generates a secret value R will be explained, a trading apparatus of the user B may generate the secret value R. That is, processes performed by the trading apparatus of the user A described below may be performed by the trading apparatus of the user B and processes performed by the trading apparatus of the user B may be performed by the trading apparatus of the user A. To simplify explanations, it is assumed that one output is included in the output of each transaction and explanations of a process of referring to an output according to Index are omitted. The quantities (exchange quantities) of crypto assets to be exchanged may be determined between the user and the trading partner on the basis of an exchange rate or the like before the atomic swap processing. The user and the trading partner may exchange their own addresses and public keys before the atomic swap processing. The user A and the user B may perform the determination on the exchange quantities of crypto assets and the exchange of the addresses and public keys by any communication method such as an e-mail or provision of a recording medium.

Step 1

The user A determines a random number as the secret value R and calculates a hash value H of the secret value R.

The user A issues a transaction Tx1 having an unlock condition that "one of arguments is an electronic signature corresponding to a public key of the user B (that is, the recipient is the user B) and an SHA256 hash value of another argument is the hash value H" and waits for an approval.

Because the approved transaction Tx1 is published on the blockchain, the user B can know the hash value H.

That is, the trading apparatus 10 of the user A randomly generates the secret value R. The trading apparatus 10 of the user A applies a hash function to the secret value R to generate the hash value H. The hash function used by the trading apparatus 10 of the user A to hash the secret value R is, for example, a one-way hash function such as SHA-2, MD5, or SHA-1.

In the case in which SHA-2 is used as the hash function, SHA256 is applied twice to calculate the hash value H. The reason why SHA256 is applied twice to calculate the hash value H is that the Script described above includes a command to perform such a calculation, and SHA256 may be applied once.

The trading apparatus 10 of the user A further creates a transaction Tx1 for sending Bitcoins to the user B. The trading apparatus 10 of the user A transmits the created transaction Tx1 to the network 30. Accordingly, the transaction Tx1 is published on the network 30.

The input of the transaction Tx1 includes ScriptSig including an electronic signature of the user A and the public key of the user A, and the transaction ID of the previous transaction including a UTXO to be unlocked. The UTXO to be unlocked by ScriptSig of the transaction Tx1 is a UTXO owned by the user A. The electronic signature of the user A and the public key of the user A are generated using a private key owned by the user A.

The output of the transaction Tx1 includes ScriptPubKey including the hash value H and a public key hash of the user B. The public key hash of the user B is generated using the public key of the user B. The public key hash of the user B is a hash value obtained by applying a hash function to the public key of the user B.

Step 2

Similarly, the user B also issues a transaction Tx2 having an unlock condition that "one of arguments is an electronic signature corresponding to the public key of the user A (that is, the recipient is the user A) and an SHA256 hash value of another argument is the hash value H" and waits for an approval.

That is, the trading apparatus 20 of the user B creates the transaction Tx2 for sending Litecoins to the user A. The trading apparatus 20 of the user B transmits the created transaction Tx2 to the network 40. Accordingly, the transaction Tx2 is published on the network 40.

The input of the transaction Tx2 includes ScriptSig including an electronic signature of the user B and the public key of the user B, and the transaction ID of the previous transaction including a UTXO to be unlocked. The UTXO to be unlocked by ScriptSig of the transaction Tx2 is a UTXO owned by the user B. The electronic signature of the user B and the public key of the user B are generated using a private key owned by the user B.

The output of the transaction Tx2 includes ScriptPubKey including the hash value H and a public key hash of the user A. The public key hash of the user A is generated using the public key of the user A. The public key hash of the user A is a hash value obtained by applying a hash function to the public key of the user A. The hash value H is acquired by the trading apparatus 20 of the user B from the transaction Tx1 and is described in the output of the transaction Tx2 when the transaction Tx1 has been published on the network 30.

Step 3

The user A confirms that the transaction Tx2 issued by the user B has been approved and has been prevented from being withdrawn or falsified.

The user A creates an electronic signature based on the own private key and performs sending to himself/herself using the UTXO of the transaction Tx2 issued by the user B as an argument for unlocking with the secret value R.

At the same time as the transaction described above is approved and is prevented from being falsified, the secret value R is published on the blockchain as data in the transaction, which enables the user B to know the secret value R.

That is, the trading apparatus 10 of the user A creates a transaction Tx3 for receiving the Litecoins from the trading apparatus 20 of the user B. The trading apparatus 10 of the user A transmits the created transaction Tx3 to the network 40. Accordingly, the transaction Tx3 is published on the network 40.

The input of the transaction Tx3 includes ScriptSig including the secret value R, the public key of the user A, and the electronic signature of the user A, and the transaction ID for identifying the transaction Tx2 including the UTXO to be unlocked.

The output of the transaction Tx3 includes ScriptPubKey including the public key hash of the user A.

A process of transferring ownership of Litecoins sent by the user B to the user A is explained through a process of unlocking the UTXO of the transaction Tx2 using the transaction Tx3 and locking the unlocked UTXO to the address of the user A as an example. The address of the user A is, for example, a value obtained by converting the public key hash of the user A.

When the transaction Tx3 is transmitted to the network 40, the node device 400 refers to the UTXO (output) of the transaction Tx2 corresponding to the transaction ID included in the transaction Tx3. The node device 400 obtains a hash value by applying a hash function to the secret value R included in ScriptSig of the transaction Tx3. The node device 400 performs a first verification to determine whether the obtained hash value matches the hash value H included in ScriptPubKey of the transaction Tx2. The hash function used by the node device 400 to obtain the hash value of the secret value R is the same hash function as that used by the trading apparatus 10 of the user A to hash the secret value R.

The node device 400 obtains a hash value by applying the hash function to the public key of the user A included in ScriptSig of the transaction Tx3. The node device 400 performs a second verification to determine whether the obtained hash value matches the public key hash of the user A included in ScriptPubKey of the transaction Tx2. The node device 400 also performs a third verification to verify the electronic signature using the electronic signature of the user A and the public key of the user A included in ScriptSig of the transaction Tx3.

When the first verification, the second verification, and the third verification described above have been successful, the node device 400 locks the UTXO of the transaction Tx2 to the address of the user A. That is, the node device 400 creates an output indicating that the user A has received the Litecoins and locks the created output as a UTXO owned by the user A and included in the transaction Tx3. Accordingly, the ownership of the Litecoins transfers from the user B to the user A.

ScriptPubKey of the transaction Tx1 may include a script for performing a process of returning the Bitcoins to the user A using the public key of the user A when the output of the transaction Tx1 remains as the UTXO after a predetermined time has passed. This enables the trading apparatus 10 of the user A to return the Bitcoins to the address of the user A after a lapse of the predetermined time when the trade is not successful. In the following explanations, the script for performing the process of returning crypto assets is referred to also as "timelock".

Step 4

The user B unlocks the UTXO of the transaction Tx1 with the electronic signature based on the private key of the user B and the secret value R, to be sent to the user B himself/herself.

That is, the trading apparatus 20 of the user B acquires the secret value R included in the transaction Tx3 that is published on the network 40 by the user A, and creates a transaction Tx4 for receiving the Bitcoins from the trading apparatus 10 of the user A. The trading apparatus 20 of the user B transmits the created transaction Tx4 to the network 30. Accordingly, the transaction Tx4 is published on the network 30.

The input of the transaction Tx4 includes ScriptSig including the secret value R, the public key of the user B, and the electronic signature of the user B, and the transaction ID for identifying the transaction Tx1 including the UTXO to be unlocked.

The output of the transaction Tx4 includes ScriptPubKey including the public key hash of the user B.

A process of transferring ownership of Bitcoins sent by the user A to the user B is explained through a process of unlocking the UTXO of the transaction Tx1 using the transaction Tx4 and locking the unlocked UTXO to the address of the user B as an example. The address of the user B is, for example, a value obtained by converting the public key hash of the user B.

When the transaction Tx4 is transmitted to the network 30, the node device 300 refers to the UTXO (output) of the transaction Tx1 corresponding to the transaction ID included in the transaction Tx4. The node device 300 obtains a hash value by applying a hash function to the secret value R included in ScriptSig of the transaction Tx4. The node device 300 performs a fourth verification to determine whether the obtained hash value matches the hash value H included in ScriptPubKey of the transaction Tx1. The hash function used by the node device 300 to obtain the hash value of the secret value R is the same hash function as that used by the trading apparatus 10 of the user A to hash the secret value R.

The node device 300 obtains a hash value by applying the hash function to the public key of the user B included in ScriptSig of the transaction Tx4. The node device 300 performs a fifth verification to determine whether the obtained hash value matches the public key hash of the user B included in ScriptPubKey of the transaction Tx1. The node device 300 further performs a sixth verification to verify the electronic signature using the electronic signature of the user B and the public key of the user B included in ScriptSig of the transaction Tx4.

When the fourth verification, the fifth verification, and the sixth verification described above have been successful, the node device 300 locks the UTXO of the transaction Tx1 to the address of the user B. That is, the node device 300 creates an output indicating that the user B has received the Bitcoins and locks the created output as a UTXO owned by the user B and included in the transaction Tx4. Accordingly, the ownership of the Bitcoins transfers from the user A to the user B.

ScriptPubKey of the transaction Tx2 may include a script for performing a process of returning the Litecoins to the user B using the public key of the user B when the output of the transaction Tx2 remains as the UTXO after a predetermined time has passed. This enables the trading apparatus 20 of the user B to return the Litecoins to the address of the user B after a lapse of the predetermined time when the trade is not successful.

ScriptPubKey indicating the unlock condition for the UTXOs of the transactions Tx1 and Tx2 respectively created by the trading apparatuses of the user A and the user B is a program as described above.

1. OP_HASH256
2. OP_PUSH H
3. OP_EQUALVERIFY
4. OP_PUSH public key
5. OP_CHECKSIG In a group of the commands 1. to 3., the hash value of an argument is calculated and is compared with the hash value H. While the commands 4. and 5. have a P2PK (pay-to-pubkey) format which is a simplest sending method, a P2PKH (pay-to-pubkey-hash) method may be used.

Corresponding scriptSig for unlocking this UTXO is as follows.

1. OP_PUSH electronic signature
2. OP_PUSH R

The secret value R is published at the time when the user A has received the secret value R because the UTXO of the transaction Tx2 cannot be unlocked without this scriptSig.

If the user A does not publish the secret value R for any reason, neither the user A nor the user B can draw their crypto assets and the ownerships of the crypto assets are left undecided. Therefore, a condition that "or, crypto assets can be retrieved with the electronic signature corresponding to the public key of the sending source when a predetermined period has passed" is added in practical cases. Specifically, scriptPubKey is set as follows.

1. OP_IF
2. OP_HASH256
3. OP_PUSH H
4. OP_EQUALVERIFY
5. OP_PUSH destination public key
6. OP_CHECKSIG
7. OP_ELSE
8. OP_CHECKLOCKTIMEVERIFY
9. OP_PUSH sending source public key
10. OP_CHECKSIG
11. OP_ENDIF The script branches by an IF command to enable two types of scriptSig to be accepted.

When the trade progresses normally, the UTXO can be unlocked by the following scriptSig.

1. OP_PUSH electronic signature of destination private key
2. OP_PUSH R
3. OP_PUSH 1

This script is called "redeem script".

OP_IF reads the last "1" and the former half of the program is executed.

If the secret value R is not published for any reason, the crypto assets can be retrieved by the following scriptSig.

1. OP_PUSH electronic signature of sending source private key
2. OP_PUSH 0

This script is called "refund script".

OP_IF reads the last "0" and a part of the program from OP_ELSE is executed to retrieve the crypto assets. However, because OP_CHECKLOCKTIMEVERIFY is included, the program needs to be executed after a lapse of the predetermined time.

Because OP_HASH256 is used in this example, the hash value H is SHA256(SHA256(R)). However, when OP_SHA256 is used, the hash value H is SHA256(R).

There are other commands for calculating a hash function and accordingly the calculation method of the hash value H needs to be selected according to the commands.

In accordance with the procedure described above, the user A has no choice but to publish the secret value R to receive the crypto assets and the user B also can receive the crypto assets at the same time as the secret value R is published.

If the user A does not publish the secret value R, the user A cannot receive the crypto assets of the user B, which can be read as that the user A is forced into publication of the secret value R.

An exchange trade between contents data and crypto assets, to which the Atomic Swap described above is applied, is explained in detail below.

Unlike the case of an exchange trade between different crypto assets explained above, only a network (the network 30 in this example) of crypto assets used by a purchaser to pay the value is used among the networks illustrated in FIG. 1.

In the following explanations, the trading apparatus 70 is a trading apparatus of a seller and the trading apparatus 80 is a trading apparatus of a purchaser.

FIG. 4 is a diagram illustrating an example of a method for exchanging contents data and crypto assets in a one-to-one relation.

Processes performed by the trading apparatus 70 explained below may be performed by the trading apparatus 80, and processes performed by the trading apparatus 80 may be performed by the trading apparatus 70. To simplify the explanations, it is assumed that an output of each transaction in a sending process via a blockchain includes one output and explanations of a process of referring to an output according to Index are omitted. The seller and the purchaser may exchange their own addresses and public keys before the exchange trade process.

For example, when the purchaser that has ordered contents data and the seller that has accepted the order of the contents data are in a one-to-one relation as in a case of crowdsourcing, abscondence can be prevented and the contents data and the crypto assets can be securely exchanged in the following procedure.

At Step 11, the trading apparatus 70 of the seller that sells contents data selects an integer as a private contents key (secret information) k using a cryptographically-secure random number. The trading apparatus 70 randomly generates the private contents key k.

Next, the trading apparatus 70 applies a hash function to the selected private contents key k to generate a public contents key u.

The hash function used to hash the private contents key k is, for example, a one-way hash function such as SHA-2, MD4, or SHA-1.

In a case in which SHA-2 is used as the hash function, the trading apparatus 70 obtains the public contents key u=SHA256(SHA256(k)).

The reason why SHA256 is multiplied twice is that commands of the program called Script adopted in Bitcoins include a command for calculating SHA256 twice. This may be changed according to the unlock condition for a sending transaction issued by the trading apparatus 80 at Step 14 described below. Calculation of SHA256 may be performed, for example, once.

At Step 12, the trading apparatus 70 of the seller performs encryption of contents data to be sold, thereby generating encrypted contents data.

At that time, the trading apparatus 70 performs frequency separation of the contents data and encrypts high frequency components using the private contents key k while keeping low frequency components in the plain text.

Frequency conversion is often applied at the time of compressing moving images or sound. JPEG, MPEG, MP3, and the like all perform the compression through frequency conversion.

After the frequency conversion is performed, the contents data is separated into the low frequency components and the high frequency components and only the high frequency components are compressed and then encrypted while the low frequency components are compressed and then kept in the plain text.

Accordingly, in a state with no decryption key, only the low frequency components can be decompressed and low-resolution video can be obtained in the case of moving images and a decompression result of a low quality can be obtained in the case of sound. The decompressed data that cannot be practically used is obtained while the delivered contents data is confirmed as ordered correct contents data.

The boundary line of frequencies to be encrypted, that is, the quality of decompressed data for confirmation can be freely selected at the time of compression or encryption.

If data is intended to be compressed after encryption, the data is barely compressed because the data has become high-entropy information.

Frequency conversion, discrete cosine transform (DCT), lapped orthogonal transform, or the like to be used in the compression of moving images or sound is normally floating-point arithmetic using a trigonometric function. Therefore, the compression is generally lossy compression. However, lossless compression may be applied, for example, when Hadamard transform is used.

In the case of a compression method not performing frequency conversion, for example, JPEG-LS or DPCM, a method of compressing differences from adjacent samples is mostly adopted. Also in this case, when samples are, for example, 0123456789 . . . , an identical effect can be obtained by handling 123, 567, and 9 as high frequency components and calculating differences from immediately-preceding samples, and handling 048 as low frequency components and calculating a difference between 0 and 4 and a difference between 4 and 8.

The trading apparatus 70 provides the encrypted contents data to the purchaser along with the public contents key u calculated at Step 11.

The encrypted contents data and the public contents key u may be uploaded and registered in any cloud storage or download service to be downloaded by the purchaser, or may be transmitted attached to an E-mail.

The encrypted contents data and the public contents key u may alternatively be stored in a storage medium such as a CD-R (Compact Disc-Recordable) or a USB (Universal Serial Bus) memory to be delivered and received by hand.

The trading apparatus 80 having acquired the encrypted contents data in any of the methods described above decompresses the low frequency components of the encrypted contents data at Step 13.

Because not having been encrypted, the low frequency components can be decompressed as they are. However, the low frequency components are data that is low in the image quality or the sound quality and is unsuitable for redistribution.

At this point of time, the purchaser can refer to the low frequency components and check details of the deliverable. However, the purchaser cannot acquire and redistribute the high frequency components of the high image quality or the high sound quality before paying the value.

It can be said that there is no risk of abscondence because the purchaser acquires only contents data of the low quality at this point of time.

The low frequency components in the encrypted contents data may be encrypted with the public contents key u for a reason explained below.

When the low frequency components have been confirmed as the low frequency components of the contents data, the trading apparatus 80 of the purchaser creates a transaction Tx11 (second trading information) for sending crypto assets as the value of the contents data to the seller at Step 14.

The trading apparatus 80 transmits the created transaction Tx11 to the network 30. Accordingly, the transaction Tx11 is published on the network 30.

The input of the transaction Tx11 includes ScriptSig including an electronic signature of the purchaser and a public key of a wallet of the purchaser (a wallet public key of the purchaser), and the transaction ID of the previous transaction including a UTXO to be unlocked.

The wallet is, for example, a crypto asset wallet in which a private key used to store virtual currency is stored. The wallet public key of the purchaser is generated using the public key of the wallet of the purchaser.

The UTXO to be unlocked by ScriptSig of the transaction Tx11 is a UTXO owned by the purchaser. The electronic signature of the purchaser and the public key of the purchaser are generated using the private key owned by the purchaser.

The output of the transaction Tx11 includes ScriptPubKey including the public contents key u obtained at Step 12 and a public key hash of a wallet of the seller.

The public key hash of the wallet of the seller is generated using a public key of the wallet of the seller (a wallet public key of the seller). The public key hash of the wallet of the seller is a hash value obtained by applying a hash function to the wallet public key of the seller. The wallet public key of the seller is generated using the public key of the wallet of the seller.

The transaction Tx11 designates the seller as a destination of crypto assets being the value of the contents data, describes the public contents key u as an additional unlock condition, and requires disclosure of the private contents key k.

For example, the transaction Tx11 enables reception of crypto assets on the condition of publication of the private contents key k itself as argument information that enables the private contents key k to be derived.

The transaction Tx11 also enables reception of crypto assets on the condition of authentication of matching between the published hash value of the private contents key k and the public contents key u.

ScriptPubKey (the unlock condition) described in the UTXO is, for example, a program described below.
1. OP_HASH256
2. OP_PUSH u
3. OP_EQUALVERIFY
4. OP_PUSH wallet public key of seller
5. OP_CHECKSIG This is the simplest example and, after SHA256 of the private contents key k is calculated twice (or once) to confirm matching with u, an electronic signature based on the private key of the wallet of the purchaser is verified.

While the program described above is conformable to a form called P2PK that designates the wallet public key as the destination, the program may be based on P2PKH that designates the hash value of the wallet public key as a generally-used destination.

The program is securer when the program is configured to enable the purchaser to retrieve the crypto assets if the crypto assets have not been received (if the private contents key k has not been disclosed) within a certain period.

In a case in which OP_SHA256 is used instead of OP_HASH256 at the head, calculation with the public contents key u=SHA256(k) provides an identical operation. In either case, there is no security difference or practical difference.

At Step 15, the trading apparatus 70 of the seller creates a transaction Tx12 (first trading information) for receiving the crypto assets from the trading apparatus 80 of the purchaser. The trading apparatus 70 transmits the created transaction Tx12 to the network 30. Accordingly, the transaction Tx12 is published on the network 30.

The input of the transaction Tx12 includes ScriptSig including the private contents key k, the public key of the wallet of the seller, and the electronic signature of the seller, and the transaction ID for identifying the transaction Tx12 including the UTXO to be unlocked.

The output of the transaction Tx12 includes ScriptPubKey having the public key hash of the wallet of the seller.

The trading apparatus 70 of the seller unlocks the UTXO issued at Step 14 with the electronic signature based on the private key of the wallet of the seller himself/herself and the private contents key k, and receives the crypto assets.

A process of transferring ownership of crypto assets sent by the purchaser to the seller is explained below through a process of unlocking the UTXO of the transaction Tx11 using the transaction Tx12 and locking the unlocked UTXO to the address of the seller as an example. The address of the seller is, for example, a value obtained by converting the public key hash of the wallet of the seller.

When the transaction Tx12 is transmitted to the network 30, the node device 300 refers to the UTXO (output) of the transaction Tx11 corresponding to the transaction ID included in the transaction Tx12. The node device 300 obtains the public contents key u by applying a hash function to the private contents key k included in ScriptSig of the transaction Tx12. The node device 300 performs a first verification to determine whether the obtained public contents key u matches the public contents key u included in ScriptPubKey of the transaction Tx11. The hash function used by the node device 300 to obtain the hash value of the private contents key k is the same hash function as that used by the trading apparatus 70 to hash the private contents key k.

The node device 300 obtains a hash value by applying the hash function to the wallet public key of the seller included in ScriptSig of the transaction Tx12. The node device 300 performs a second verification to determine whether the obtained hash value matches the public key hash of the wallet of the seller included in ScriptPubKey of the transaction Tx11. The node device 300 also performs a third verification to verify the electronic signature using the electronic signature and the wallet public key of the seller included in ScriptSig of the transaction Tx12.

When the first verification, the second verification, and the third verification described above have been successful, the node device 300 locks the UTXO of the transaction Tx11 to the address of the seller. That is, the node device 300 creates an output indicating that the seller has received the crypto assets, and locks the created output as a UTXO owned by the seller and included in the transaction Tx12. Accordingly, the ownership of the crypto assets transfers from the purchaser to the seller.

ScriptPubKey of the transaction Tx11 includes a script for performing a process of returning the crypto assets to the seller using the wallet public key of the seller when the output of the transaction Tx11 remains as the UTXO after a predetermined time has passed. This enables the trading apparatus 70 to return the crypto assets to the address of the seller after a lapse of the predetermined time if the trade is not successful.

Returning to the explanations of FIG. 4, at Step 16, the trading apparatus 80 of the purchaser acquires the private contents key k included in the transaction Tx12 that is published on the network 30 by the trading apparatus 70 of the seller and that is recorded/published on the blockchain. The trading apparatus 80 of the purchaser decrypts the high frequency components of the encrypted contents data uploaded on a cloud storage or the like at Step 12 with the private contents key k to decompress the entire contents data.

After checking details of the contents data beforehand from data of a quality that is not suitable for redistribution, the purchaser of the contents data performs sending of crypto assets being the value for the contents data. In response thereto, the seller discloses the private contents key k and receives the crypto assets, so that the purchaser can decrypt the high-quality portion of the contents data.

Unless both the purchaser and the seller send respective crypto assets and disclose the private contents key k, neither thereof can receive the crypto assets or the private contents key k.

Therefore, abscondence of the purchaser with contents data or abscondence of the seller with crypto assets is impossible. A proper trade in which contents data and the value are appropriately exchanged between the purchaser and the seller can be realized.

In the method described above, an attack where the trading apparatus 70 of the seller encrypts the high frequency components of the contents data using a key other than the private contents key k at Step 12 is expected.

This problem can be solved by packaging the public contents key u and the encrypted contents data in one file as a unique file format. However, to be cryptographically secure, a method of encrypting the low frequency components with the public contents key u is conceivable.

When the low frequency components are encrypted with the public contents key u and the high frequency components are encrypted with the private contents key k at Step 12, decompression fails if the public contents key u received when the purchaser checks the delivered contents data at Step 13 and the actual encryption key for the low frequency components are different.

At that time, it is known that the high frequency components of the contents data have been encrypted with a key other than the private contents key k at Step 12, which enables the trade to be redone.

When the trade is performed in a correct procedure, the trading apparatus 80 can decrypt/decompress the low frequency components using the public contents key u at Step 13. Further, when the trade is performed in a correct procedure, the trading apparatus 80 can decrypt/decompress the entire encrypted contents data because the public contents key u and the private contents key k are both on the purchaser side at Step 16.

Figure 5:
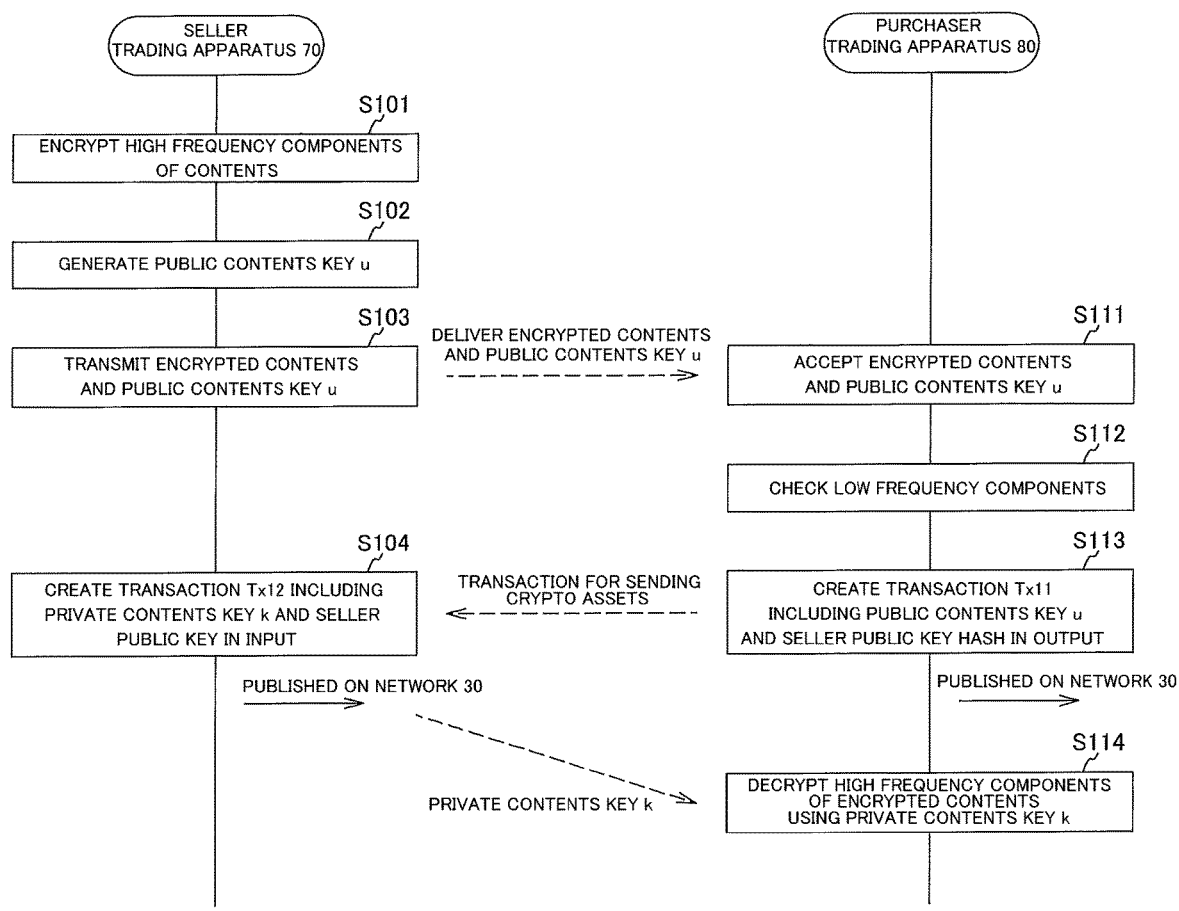
FIG. 5 is a flowchart for explaining a flow of a trading method explained with reference to FIG. 4.

FIG. 5 is a flowchart for explaining the flow of the trading method explained with reference to FIG. 4.

In the following explanations, it is assumed that P2PKH is used as a transaction script similarly in FIG. 4.

At Step S101, the trading apparatus 70 of the seller encrypts the high frequency components of the contents data using the private contents key k.

At Step S102, the trading apparatus 70 of the seller applies the hash function to the private contents key k to generate the public contents key u.

At Step S103, the trading apparatus 70 of the seller transmits the encrypted contents data including the encrypted high frequency components and the low frequency components kept in the plain text, and the public contents key u to a cloud storage or the like. Alternatively, the encrypted contents data and the public contents key u are transmitted to the address of the purchaser by an E-mail.

At Step S111, the trading apparatus 80 of the purchaser acquires the encrypted contents data and the public contents key u from the cloud storage or the like.

At Step S112, the trading apparatus 80 of the purchaser decompresses the low frequency components and checks the details.

At Step S113, the trading apparatus 80 of the purchaser creates the transaction Tx11 for sending crypto assets to the seller and including the public contents key u and the public key of the seller in an output, and publishes the created transaction Tx11 on the network 30.

At Step S104, the trading apparatus 70 of the seller creates the transaction Tx12 for receiving the crypto assets and including the private contents key k and the public key of the seller in an input for the published transaction Tx11, and publishes the created transaction Tx12 on the network 30.

At Step S114, the trading apparatus 80 of the purchaser decrypts the high frequency components of the encrypted contents data using the private contents key k described in the published transaction Tx12.

While the method of exchanging contents data and crypto assets between the purchaser and the seller of the contents data on a one-to-one basis has been explained above, a case in which there is one seller and a plurality of purchasers, such as a download sale of contents data, is also supposed.

FIG. 6 is a diagram illustrating an example of a method of exchanging contents data and crypto assets on a one-to-many basis.

The method illustrated in FIG. 6 can be applied also to the exchanging of contents data and crypto assets on a one-to-one basis performed by one seller and one purchaser.

To use the trading method on a one-to-one basis explained with reference to FIG. 4 in a one-to-many trade, it is necessary to prepare an individual private contents key k and prepare individual encrypted contents data for each of purchasers. In such a case, management is hard particularly in a case where the file size is large, such as in the case of video.

This problem can be solved by using a smart contract of Ethereum.

A smart contract 500 having functions described below is deployed on the Ethereum beforehand.

Because a smart contract itself is an account, the smart contract itself can own crypto assets and, at the time of sending to the smart contract or operating thereof, the arguments are recorded on the blockchain.

The smart contract 500 includes one or more programs called "method" each provided with a freely-selected name.

A method that commands execution to the smart contract 500 and arguments thereof are described in a transaction to be transmitted to the smart contract 500.

For example, a transaction includes a command "execute a method having a name AA with an argument BB".

The smart contract 500 can realize, for example, the following functions (1) to (4) by executing the commanded method with the designated argument.

The smart contract 500 includes
(1) a function to hold crypto assets,
(2) a function to record a recipient address and a point P on an elliptic curve described later when holding crypto assets,
(3) a function to draw crypto assets, and
(4) a function to provide that the recipient addresses at the time of drawing and at the time of deposition match and that an argument h meeting P=hG is designated to draw crypto assets.

With deployment of the smart contract 500 having these functions, it can be ensured that crypto assets cannot be drawn without publication on the blockchain of the private contents key k corresponding to the public contents key u=kG that can be known on the sending side.

A function to enable the sender to retrieve crypto assets after passage of a predetermined time may be added.

It is assumed in the following explanations that a random number that is always cryptographically secure is generated when a random number is to be generated.

At Step 21, the trading apparatus 70 of the seller determines the private contents key k using a random number.

At Step 22, the trading apparatus 70 generates encrypted contents data including the low frequency components of the contents data kept in the plain text and the high frequency components encrypted with the private contents key k.

The trading apparatus 70 publishes the encrypted contents data on a cloud storage or the like, along with the public contents key u=kG obtained by encrypting the private contents key k using elliptic curve encryption.

The public contents key u=kG is a value obtained by scalar multiplication of a base point G on a group for which a discrete logarithm problem is intractable, by the private contents key k.

The elliptic curve encryption is briefly explained below.
[Elliptic Curve Encryption]

An equation (precisely, a set of solutions thereof) expressed in a form:

$$y^2 = x^3 + ax + b$$

is called "elliptic curve". In this equation, x and y are variables, and a and b are constants (parameters).

When the equation is solved in a range of real numbers and the solutions are plotted on a x-y plane, a curve is obtained. However, a computer cannot handle real numbers in the true sense. Therefore, a prime number p is determined, a, b, x, and y are all set to integers not less than zero and less than p, then addition is defined by (n+m) mod p, and multiplication is defined by (n×m) mod p to constitute a finite field.

Solutions obtained by solving the equation described above on this finite field are plotted as a set of integer points (points where the x coordinate and the y coordinate are both integers) not less than zero and less than p on the x-y plane.

Solutions of the equation of the elliptic curve are points at x and y representing coordinates on a two-dimensional surface in both the case in which the equation is solved on real numbers and the case in which the equation is solved on a finite field, and arithmetic of two of these points is defined as follows.

$$x_3 = \left(\frac{y_2 - y_1}{x_2 - x_1}\right)^2 - x_1 - x_2$$

It is also defined as follows.

$$y_3 = \frac{y_2 - y_1}{x_2 - x_1}(x_1 - x_3) - y_1$$

However, when the two points are the same, the denominator is zero and therefore the limit is calculated.

$$x_3 = \left(\frac{3x_1^2 + a}{2y_1}\right)^2 - 2x_1$$

Further, it is defined as follows.

$$y_3 = \frac{3x_1^2 + a}{2y_1}(x_1 - x_3) - y_1$$

As a special point, a point not existing on a two-dimensional surface, i.e., a point O at infinity is also added to elements. In a case in which the x coordinates of two points are same and the y coordinates thereof have same values and signs inverted, arithmetic of the two points makes the point O at infinity, arithmetic of a point P on an elliptic curve and the point O makes the point P, and arithmetic of the points O makes the point O.

The arithmetic according to the rules described above is generally defined as addition of points on an elliptic curve. With this definition, points on an elliptic curve have the property of a finite cyclic group. That is, a point P and a point Q on an elliptic curve can be added and arithmetic P+Q=R can be performed. The point P can also be continuously added a finite number of times (P+P+P+ . . . ), that is, m×P can be calculated, and nP=O holds when P is multiplied by an order n of the group (n pieces of P are continuously added).

What is important is that, when a secret integer (not less than zero and less than n) k is set, kP can be easily obtained (the calculation amount proportional to 2L is required for a bit length L of p when P are added k times; however, only the calculation amount proportional to L is required when a method such as a binary method is used), while it is practically infeasible to obtain k when conversely kP is given.

Currently known methods require, if not 2L, an equivalent calculation amount.

That is, there is an asymmetry property where the arithmetic k→kP is easy and the arithmetic kP→k is difficult, which is called ECDLP (elliptic curve discrete logarithm problem).

The elliptic curve encryption utilizes the ECDLP. The ECDSA used in sending of crypto assets also uses this asymmetry property.

In some cases, the asymmetry property is not maintained unless the parameters a, b, and p of the elliptic curve used in the elliptic curve encryption are appropriately set. Therefore, parameters defined in a SEC. 2 document published by a group named the SECG, or a FIPS-186 document being a US standard published by the NIST in the U.S. are generally used.

In the FIPS-186 or the SEC. 2, a point G (called "base point") being a base for constituting a finite cyclic group and n that meets nG=O are also published as well as the parameters a, b, and p.

In the case of Bitcoins and crypto assets derived therefrom, a curve called secp256k1 that is defined in the SEC. 2 is used.

Returning to the explanations of FIG. 6, the trading apparatus 80 having acquired the encrypted contents data decompresses the low frequency components of the encrypted contents data.

At Step 23, the trading apparatus 80 of the purchaser determines a temporary key t using a random number and transmits the temporary key t to the trading apparatus 70 of the seller through a secure communication path. For example, the temporary key t may be transmitted to the trading apparatus 70 via an encrypted communication line.

The temporary key t may be directly handed over from the purchaser to the seller in a state of being stored in a storage medium. In any format, the temporary key t is transmitted from the trading apparatus 80 of the purchaser to the trading apparatus 70 of the seller in a state of being kept secret from others.

When the low frequency components are confirmed as the low frequency components of the contents data, the trading apparatus 80 of the purchaser transmits a transaction Tx21 (second trading information) to the smart contract 500 to send payment to the address of the seller (the hash of the wallet public key of the seller) at Step 24.

The transaction Tx21 includes a command for executing a method to send crypto assets with the public contents key u and the public key hash of the wallet of the seller used as arguments.

The smart contract 500 performs the function (1) described above to the transaction Tx21 and holds crypto assets for the seller as a recipient, using the public contents key u. More specifically, the smart contract 500 holds the crypto assets for the address of the seller as a sending destination.

The address of the seller is the public key hash of the wallet of the seller designated in the transaction Tx21.

The smart contract 500 performs the function (2) described above and records the point P on the elliptic curve using the public contents key u when holding the crypto assets.

The smart contract 500 computes P=tG+u and records the computed point P. In this example, tG+u=(t+k)G holds. As described above, G is the base point for a finite cyclic group (a group for which the discrete logarithm problem is intractable).

At Step 25, the trading apparatus 70 of the seller confirms the payment deposited into the smart contract 500 and thereafter creates a transaction Tx22 (first trading information) for drawing the crypto assets with h=(t+k) mod n, which is the sum of the temporary key t transmitted at Step 23 and the private contents key k, designated as an argument. The transaction Tx22 is a transaction for executing a crypto asset drawing method.

That is, the transaction Tx22 includes a command for executing a method to send the crypto assets with the argument h=(t+h) mod n and the public key hash of the wallet of the seller used as arguments.

The smart contract 500 performs the function (3) described above to the transaction Tx22, and draws the crypto assets held in response to the transaction Tx21.

That is, the smart contract 500 creates a transaction (a drawing transaction for the crypto assets according to a drawing method) for sending the crypto assets to the address of the seller with the seller as the recipient.

The smart contract 500 performs the function (4) when drawing the crypto assets, and requires that the recipient address at the time of drawing matches the recipient address at the time of holding and that the argument h meeting P=hG is designated.

Because the relation P=tG+u=(t+k)G holds as described above, P=hG is met by designating the argument h=(t+k) mod n.

The smart contract 500 sends the holding crypto assets to the address of the seller when it is verified that the addresses of the crypto asset recipient designated in the transaction Tx22 and the transaction Tx21 match and that the argument h meeting P=hG is designated.

At Step 26, because the trading apparatus 80 of the purchaser can acquire the private contents key k by reading the argument h(t+k) mod n recorded in the transaction Tx22 that is used in the drawing from the smart contract 500, and calculating k=(h+n−t) mod n using the temporary key t determined at Step 23, the trading apparatus 80 decrypts and decompresses the entire data including the high frequency components.

According to the mechanism described above, the purchaser of contents data checks details of the contents data beforehand based on data of a quality that is not suitable for redistribution, and then sends crypto assets as the value for the contents data. The seller discloses arguments based on the private contents key k and performs receipt of the crypto assets. This enables the purchaser to acquire the private contents key k published on the blockchain and to decrypt the high quality portion of the contents data. Until the purchaser sends the crypto assets and the seller discloses the arguments based on the private contents key k, the seller and the purchaser cannot receive the crypto asserts and the private contents key k, respectively.

Therefore, abscondence of the purchaser with the contents data or abscondence of the seller with the crypto assets is impossible. A proper trade in which the purchaser and the seller appropriately exchange the contents data and the value can be realized.

The seller prepares only one private contents key k and generates arguments based on the private contents key k on the basis of the temporary key t prepared by the purchaser. Therefore, the load of the seller can be significantly reduced relative to a case in which the seller prepares the private contents key k for each purchaser to encrypt contents data.

Further, as described above, the temporary key t is transmitted from the trading apparatus 80 of the purchaser to the trading apparatus 70 of the seller in a state of being kept secret from others.

However, if the temporary key k is leaked to others, the others can calculate k=(a+n−t) mod n using the temporary key t to acquire the private contents key k in the same manner as performed by the purchaser at Step 26. The others can decrypt the high quality portion of the contents using the acquired contents key k.

However, even the contents data decrypted using the normally acquired private contents key k is likely to be uploaded on a cloud storage or the like in a state of being available to third parties. Considering this, leakage of the contents data due to leakage of the temporary key t is not a large problem.

Similarly in the method explained with reference to FIG. 4, encryption of the low frequency components with the public contents key u is more preferable.

While an elliptic curve and points thereon are used in the above explanations, a multiplicative group of a finite field may, for example, be applied as long as this is a finite cyclic group for which the discrete logarithm problem is intractable. An advantage of using an elliptic curve is that transaction fees can be reduced because the bit length required to represent a point is smaller.

Although the argument h is obtained on the basis of the sum of the temporary key t and the private contents key k in the above explanations, the argument h may be obtained on the basis of a difference between the temporary key t and the private contents key k. The argument h may be (t−k) mod n.

Figure 7:
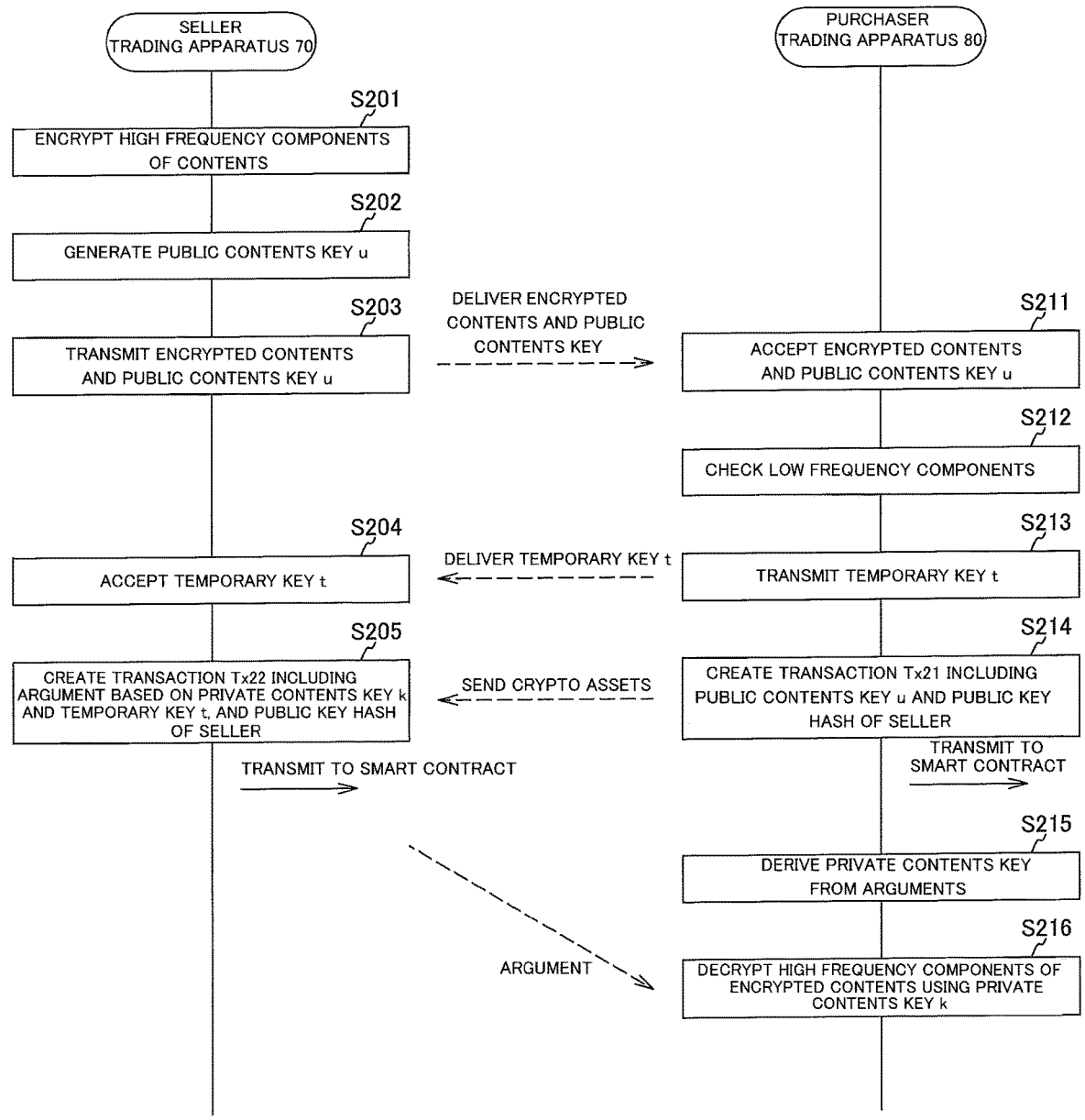
FIG. 7 is a flowchart explaining a flow of a trading method explained with reference to FIG. 6.

FIG. 7 is a flowchart explaining the flow of the trading method explained with reference to FIG. 6.

At Step S201, the trading apparatus 70 of the seller encrypts the high frequency components of contents data using the private contents key k.

At Step S202, the trading apparatus 70 of the seller generates the public contents key u by applying the hash function to the private contents key k.

At Step S203, the trading apparatus 70 of the seller transmits the encrypted contents data including the encrypted high frequency components and the low frequency components kept in the plain text, and the public contents key u to a cloud storage or the like. Alternatively, the trading apparatus 70 transmits the encrypted contents data and the public contents key u to the purchaser by an E-mail.

At Step S211, the trading apparatus 80 of the purchaser acquires the encrypted contents data and the public contents key u from the cloud storage or the like.

At Step S212, the trading apparatus 80 of the purchaser decompresses the low frequency components and checks the details.

At Step S213, the trading apparatus 80 of the purchaser determines the temporary key t and transmits the temporary key t to the trading apparatus 70 of the seller.

At Step S204, the trading apparatus 70 of the seller receives the temporary key t from the trading apparatus 80 of the purchaser. The trading apparatus 70 of the seller then accepts the temporary key t.

At Step S214, the trading apparatus 80 of the purchaser creates the transaction Tx21 described above for sending crypto assets to the seller and including the public contents key u and the public key of the seller in an output, and transmits the created transaction Tx21 to a smart contract.

At Step 205, the trading apparatus 70 of the seller creates the transaction Tx22 described above for receiving the crypto assets and including the argument based on the private contents key k and the temporary key t, and the public key of the seller in an input for the published transaction Tx21, and transmits the created transaction Tx22 to the smart contract.

At Step S215, the trading apparatus 80 of the purchaser derives the private contents key k from the arguments described in the published transaction Tx22.

At Step S216, the trading apparatus 80 of the purchaser decrypts the high frequency components of the encrypted contents data using the private contents key k.

The trading apparatus according to the embodiment is explained.

Figure 8A:
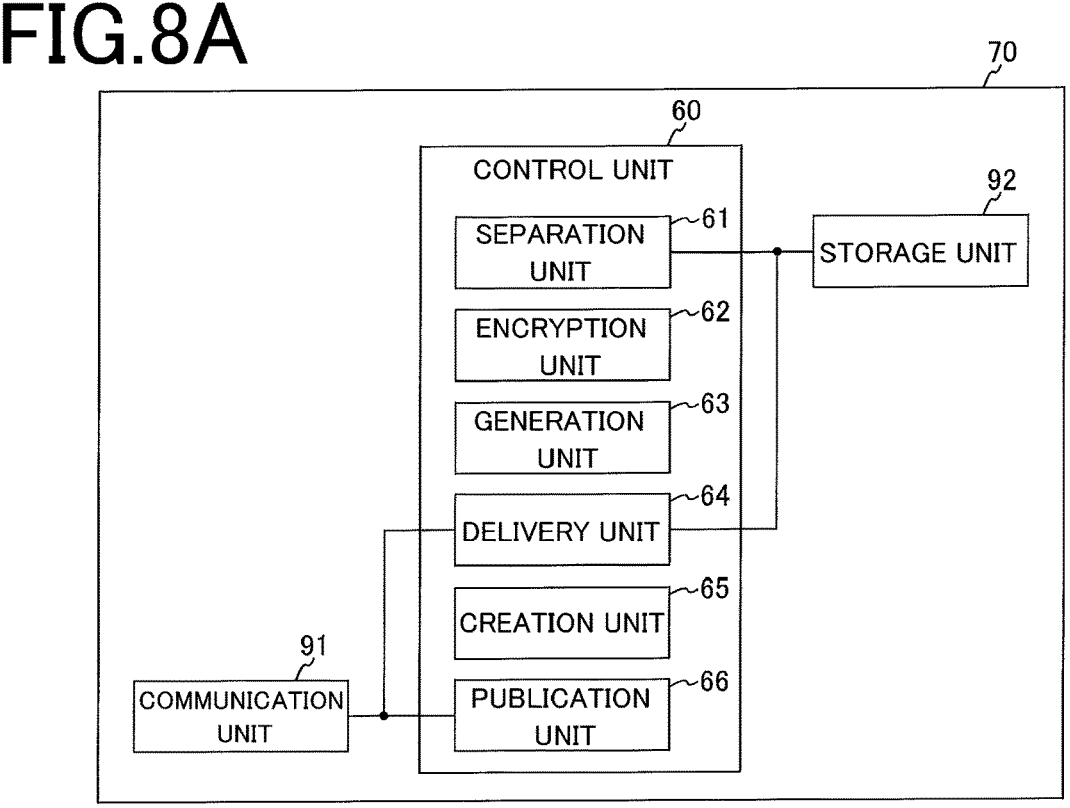
FIGS. 8A and 8B are functional block diagrams illustrating a practical example of a trading apparatus.
Figure 8B:
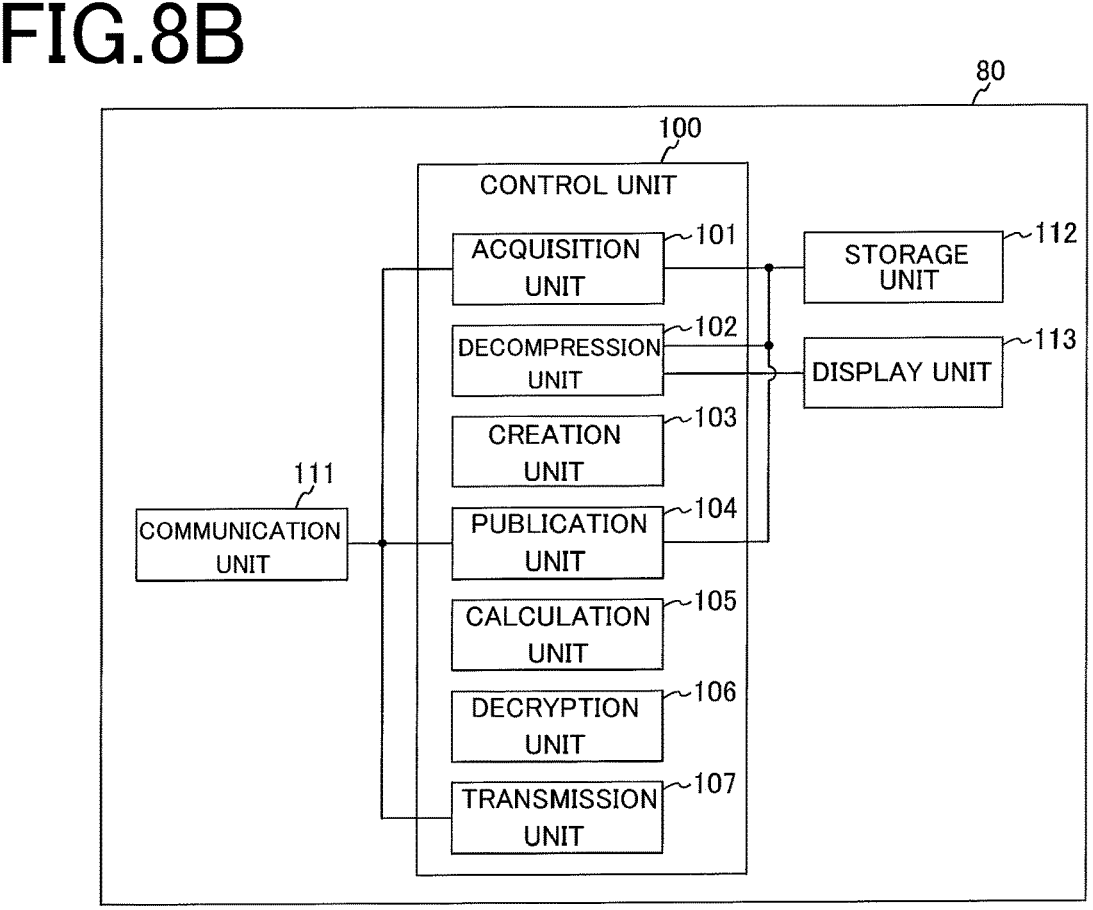

FIGS. 8A and 8B are functional block diagrams illustrating a practical example of the trading apparatus.

FIGS. 8A and 8B are block diagrams illustrating functions included in the trading apparatus 70 and the trading apparatus 80.

The functions of the trading apparatus 70 are explained with reference to FIG. 8A. The trading apparatus 80 may have at least one or more of the functions of the trading apparatus 70.

The trading apparatus 70 includes a control unit 60, a communication unit 91, and a storage unit 92.

The control unit 60 includes a separation unit 61, an encryption unit 62, a generation unit 63, a delivery unit 64, a creation unit 65 (a first creation unit), and a publication unit 66 (a first publication unit). The communication unit 91 connects the trading apparatus 70 to a network. The storage unit 92 has various types of information stored therein.

The separation unit 61 separates frequency-converted contents data into high frequency components and low frequency components.

The encryption unit 62 encrypts the high frequency components of the contents data using the private contents key k stored in the storage unit 92. The encryption unit 62 may encrypt the low frequency components using the public contents key u.

The generation unit 63 applies a hash function to the private contents key k to generate the public contents key u. For example, the generation unit 63 generates the public contents key u as u=SHA256(SHA256(k)). The generation unit 63 also generates the public contents key u=kG by scalar multiplication of the base point on a group for which the discrete logarithm problem is intractable, by the private contents key k.

The delivery unit 64 transmits the encrypted contents data and the public contents key u to outside such as a cloud storage. Alternatively, the delivery unit 64 transmits the encrypted contents data and the public contents key u by an E-mail.

The creation unit 65 creates the transaction Tx12 for receiving crypto assets after the transaction Tx11 that sends the crypto assets is published on the network 30.

The creation unit 65 also creates the transaction Tx22 for receiving the crypto assets after the transaction Tx21 that sends crypto assets to the smart contract 500 is published.

The publication unit 66 publishes the transaction Tx12 created by the creation unit 65 on the network 30. The publication unit 66 also publishes the transaction Tx22 created by the creation unit 65 on the network 30.

The functions of the trading apparatus 80 are explained with reference to FIG. 8B. The trading apparatus 70 may include at least one or more functions of the trading apparatus 80.

The trading apparatus 80 includes a control unit 100, a communication unit 111, a storage unit 112, and a display unit 113.

The control unit 100 includes an acquisition unit 101, a decompression unit 102, a creation unit 103 (a second creation unit), a publication unit 104, a calculation unit 105, a decryption unit 106, and a transmission unit 107. The storage unit 112 has various types of information stored therein.

The acquisition unit 101 acquires the encrypted contents data and the public contents key u from a cloud storage or the like. The acquisition unit 101 also acquires the private contents key k published on the network 30 or the argument h=(t+k) mod n based on the private contents key k.

The decompression unit 102 decompresses decrypted or unencrypted contents data and displays the decompressed data on a display device. When the contents are audio data, the data is output from a speaker included in the trading apparatus 80.

The creation unit 103 creates the transaction Tx11 or the transaction Tx21 for sending crypto assets. The creation unit 103 also creates the temporary key t.

The publication unit 104 publishes the transaction Tx11 or the transaction Tx21 created by the creation unit 103 on the network 30.

The calculation unit 105 calculates the private contents key k on the basis of the argument h=(t+k) mod n acquired by the acquisition unit 101.

The decryption unit 106 decrypts the encrypted high frequency components using the private contents key k acquired by the acquisition unit 101 or calculated by the calculation unit 105.

The transmission unit 107 transmits the temporary key t created by the creation unit 103.

Figure 9:
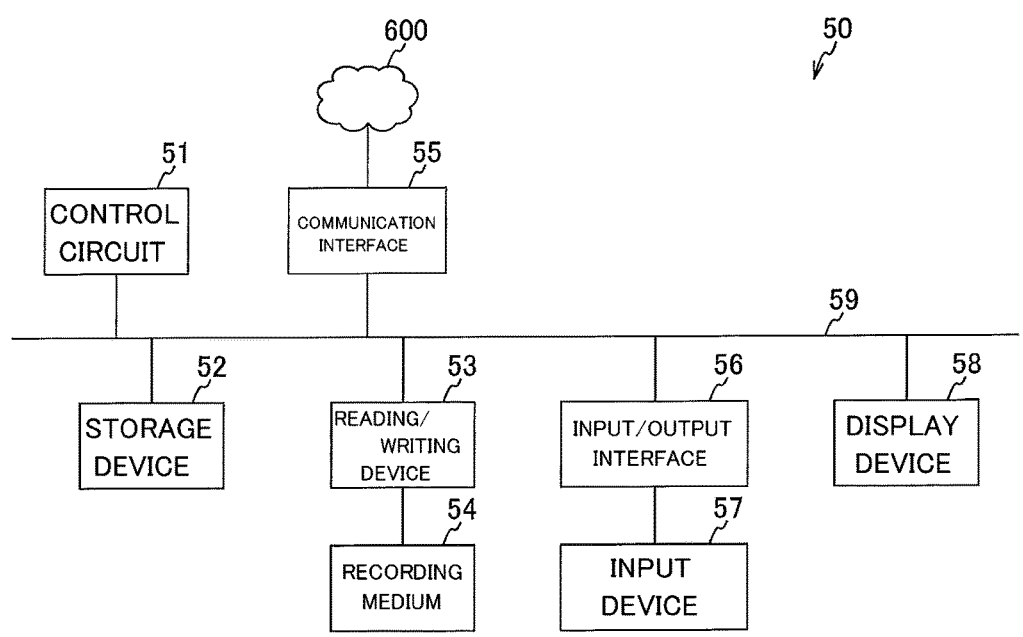
FIG. 9 is a block diagram illustrating a practical example of computer devices.

FIG. 9 is a block diagram illustrating a practical example of the computer devices.

A configuration of a computer device 50 is explained with reference to FIG. 9.

In FIG. 9, the computer device 50 includes a control circuit 51, a storage device 52, a reading/writing device 53, a recording medium 54, a communication interface 55, an input/output interface 56, an input device 57, and a display device 58. The communication interface 55 is connected to a network 600. These constituent elements are connected with a bus 59. The trading apparatus 10, the trading apparatus 20, the trading apparatus 70, and the trading apparatus 80 can be configured by appropriately selecting some or all of the constituent elements included in the computer device 50.

The control circuit 51 controls the entire computer device 50. The control circuit 51 is, for example, a processor such as a central processing unit (CPU), a field programmable gate array (FPGA), an application specific integrated circuit (ASIC), and a programmable logic device (PLD). For example, the control circuit 51 functions as the control unit 60 in FIG. 8A.

The storage device 52 has various types of data stored therein. The storage device 52 is, for example, a memory such as a read only memory (ROM) or a random access memory (RAM), or a hard disk (HD). The storage device 52 may have stored therein a trading program for causing the control circuit 51 to function as the control unit 60. For example, the storage device 52 functions as the storage unit 92 and the storage unit 112 in FIGS. 8A and 8B.

The trading apparatus 70 and the trading apparatus 80 load the trading program stored in the storage device 52 into the RAM when performing a trading process.

The trading apparatus 70 executes a trading process including any one or more of a separation process, an encryption process, a generation process, a delivery process, a creation process, and a publication process by executing the trading program loaded into the RAM in the control circuit 51.

The trading apparatus 80 executes a trading process including any one or more of an acquisition process, a decompression process, a creation process, a publication process, a calculation process, a decryption process, and a transmission process by executing the trading program loaded into the RAM in the control circuit 51. The trading program may be stored in a storage device included in a server on the network 600 as long as the control circuit 51 can access the trading program via the communication interface 55.

The reading/writing device 53 is controlled by the control circuit 51 and performs read/write of data from/in the detachable recording medium 54.

The recording medium 54 stores various types of data therein. The recording medium 54 stores, for example, the trading program therein. The recording medium 54 is, for example, a non-transitory computer-readable recording medium such as a secure digital (SD) memory card, a floppy disk (FD), a compact disc (CD), a digital versatile disk (DVD), a Blu-ray (registered trademark) disk (BD), and a flash memory.

The communication interface 55 connects the computer device 50 to other devices via the network 600 to be communicable to each other. The communication interface 55 functions as, for example, the communication unit 91 in FIG. 8A.

The input/output interface 56 is, for example, an interface that detachably connects to various input devices. The input/output interface 56 connects the computer device 50 to connected various input devices to be communicable to each other. The input/output interface 56 outputs a signal input from the connected various input devices to the control circuit 51 via the bus 59. The input/output interface 56 outputs a signal output from the control circuit 51 to an input/output device via the bus 59.

The input device 57 is, for example, a touch panel, a code reading device, a keyboard, or a mouse. The various input devices connected to the input/output interface 56 and the input device 57 may receive, for example, inputs of a private key, a wallet public key, a transaction ID, and a private contents key k from a user and a trading partner.

The display device 58 displays various types of information. For example, the display device 58 can be configured to be capable of displaying decompressed image contents. For example, the display device 58 functions as the display unit 113 in FIG. 8B.

The network 600 is, for example, a LAN, a wireless communication, a P2P network, or the Internet and communicably connects the computer device 50 to other devices.

Embodiments of the present invention are not limited to the embodiments described above, and various types of configurations and embodiments can be employed without departing from the scope of the embodiments described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations.

What is claimed is:

1. A trading system comprising a first computer apparatus that a seller of contents consisting of sounds or images uses and a second computer apparatus that a purchaser of the contents uses, wherein
the first computer apparatus comprises a first processor which generates a private contents key randomly selected from integers using a cryptographically-secure random number;

encrypts the contents using the private contents key; and generates a public contents key by applying a hash function to the private contents key, and the second computer apparatus comprises a second processor which acquires the public contents key and an encrypted contents; and publishes a first transaction which executes a process of delivering crypto assets on a condition of publication to a distributed ledger of the private contents key to which the public contents key is generated by applying the hash function, the first transaction including the public contents key, wherein the first processor further receives the crypto assets by publishing to the distributed ledger a second transaction for receiving the crypto assets, when the first transaction is published to the distributed ledger, the second transaction including the private contents key, and the second processor further acquires the private contents key, when the second transaction is published, to decode the encrypted contents using the private contents key.

2. A trading system comprising a first computer apparatus that a seller of contents consisting of sounds or images uses and a second computer apparatus that a purchaser of the contents uses, wherein the first computer apparatus comprises a first processor which generates a private contents key randomly selected from integers using a cryptographically-secure random number;

encrypts the contents using the private contents key; and generates a public contents key by scalar multiplication of a base point on a group for which a discrete logarithm problem is intractable, by the private contents key, and the second computer apparatus comprises a second processor which acquires the encrypted contents;

generates a temporary key selected from integers; and transmits to the first computer apparatus the generated temporary key, wherein the first processor further receives the temporary key from the second computer apparatus, the second processor publishes a first transaction which executes a process of delivering crypto assets on a condition of publication of argument information that enables derivation of the private contents key that is a sum of or a difference between the temporary key and the private contents key, the first processor calculates the argument information using the generated private contents key and the received temporary key, the first processor further receives the crypto assets by publishing to a distributed ledger a second transaction for receiving the crypto assets, when the first transaction is published to the distributed ledger, the second transaction including the argument information, and the second processor further acquires the argument information, when the second transaction is published to the distributed ledger, calculates the private contents key using the acquired argument information and the generated temporary key, and decodes the encrypted contents using the calculated private contents key.

3. A trading system comprising a first computer apparatus that a seller of contents consisting of sounds or images uses and a second computer apparatus that a purchaser of the contents uses, wherein the first computer apparatus comprises a first processor which separates the contents to which frequency separation is performed into high frequency components and low frequency components;

encrypts the high frequency components using a private contents key randomly selected from integers using a cryptographically-secure random number, and the second computer apparatus comprises a second processor which acquires the low frequency components and the encrypted high frequency components;

decompress the low frequency components to enable the decompressed low frequency components to be confirmed, and;

when the decompressed low frequency is confirmed to be low frequency components of the contents, publishes a first transaction which executes a process of delivering crypto assets on a condition that the private contents key is published to a distributed ledger, wherein the first processor further receives the crypto assets by publishing to the distributed ledger a second transaction for receiving the crypto assets, when the first transaction is published to the distributed ledger, the second transaction including the private contents key, and the second processor further acquires the private contents key, when the second transaction is published, and to decode the encrypted high frequency components using the private contents key so as to decompress the whole contents.

4. A trading method executed by a trading system comprising a first computer apparatus comprising a first processor that a seller of contents consisting of sounds or images uses and a second computer apparatus comprising a second processor that a purchaser of the contents uses, the method comprising:

generating, by the first processor, a private contents key randomly selected from integers using a cryptographically-secure random number;

encrypting, by the first processor, the contents using the private contents key;

generating, by the first processor, a public contents key by applying a hash function to the private contents key;

acquiring, by the second processor, the public contents key and an encrypted contents; and publishing, by the second processor, a first transaction which executes a process of delivering crypto assets on a condition of publication to a distributed ledger of the private contents key to which the public contents key is generated by applying the hash function, the first transaction including the public contents key;

the method further comprising:

further receiving, by the first processor, the crypto assets by publishing to the distributed ledger a second transaction for receiving the crypto assets, when the first transaction is published to the distributed ledger, the second transaction including the private contents key, and further acquiring, by the second processor, the private contents key, when the second transaction is published, to decode the encrypted contents using the private contents key.

5. A trading method executed by a trading system comprising a first computer apparatus comprising a first processor that a seller of contents consisting of sounds or images uses and a second computer apparatus comprising a second processor that a purchaser of the contents uses, the method comprising:

generating, by the first processor, a private contents key randomly selected from integers using a cryptographically-secure random number;

encrypting, by the first processor, the contents using the private contents key; and generating, by the first processor, a public contents key by scalar multiplication of a base point on a group for which a discrete logarithm problem is intractable, by the private contents key;

acquiring, by the second processor, the encrypted contents;

generating, by the second processor, a temporary key selected from integers; and transmitting, by the second processor, to the first computer apparatus the generated temporary key, the method further comprising:

further receiving, by the first processor, the temporary key from the second computer apparatus;

publishing, by the second processor, a first transaction which executes a process of delivering crypto assets on a condition of publication of argument information that enables derivation of the private contents key that is a sum of or a difference between the temporary key and the private contents key;

calculating, by the first processor, the argument information using the generated private contents key and the received temporary key;

further receiving, by the first processor, the crypto assets by publishing to a distributed ledger a second transaction for receiving the crypto assets, when the first transaction is published to the distributed ledger, the second transaction including the argument information; and further, by the second processor, acquiring the argument information, when the second transaction is published to the distributed ledger, calculating the private contents key using the acquired argument information and the generated temporary key, and decoding the encrypted contents using the calculated private contents key.

6. A trading method executed by a trading system comprising a first computer apparatus comprising a first processor that a seller of contents consisting of sounds or images uses and a second computer apparatus comprising a second processor that a purchaser of the contents uses, the method comprising:

separating, by the first processor, the contents to which frequency separation is performed into high frequency components and low frequency components; and encrypting, by the first processor, the high frequency components using a private contents key randomly selected from integers using a cryptographically-secure random number;

acquiring, by the second processor, the low frequency components and the encrypted high frequency components;

decompressing, by the second processor, the low frequency components to enable the decompressed low frequency components to be confirmed; and when the decompressed low frequency is confirmed to be low frequency components of the contents, publishing, by the second processor, a first transaction which executes a process of delivering crypto assets on a condition that the private contents key is published to a distributed ledger, the method comprising:

further receiving, by the first processor, the crypto assets by publishing to the distributed ledger a second transaction for receiving the crypto assets, when the first transaction is published to the distributed ledger, the second transaction including the private contents key, and further acquiring, by the second processor, the private contents key, when the second transaction is published, and to decode the encrypted high frequency components using the private contents key so as to decompress the whole contents.

* * * * *